(12) United States Patent
Zhang et al.

(10) Patent No.: US 12,426,071 B2
(45) Date of Patent: Sep. 23, 2025

(54) DISTANCE-BASED CHANNEL OCCUPANCY TIME (COT) SHARING

(71) Applicant: QUALCOMM Incorporated, San Diego, CA (US)

(72) Inventors: Xiaoxia Zhang, San Diego, CA (US); Jing Sun, San Diego, CA (US); Yisheng Xue, San Diego, CA (US); Chih-Hao Liu, San Diego, CA (US); Changlong Xu, Beijing (CN); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 17/906,605

(22) PCT Filed: Apr. 20, 2020

(86) PCT No.: PCT/CN2020/085605
§ 371 (c)(1),
(2) Date: Sep. 16, 2022

(87) PCT Pub. No.: WO2021/212265
PCT Pub. Date: Oct. 28, 2021

(65) Prior Publication Data
US 2023/0189304 A1     Jun. 15, 2023

(51) Int. Cl.
*H04W 72/50*     (2023.01)
*H04W 64/00*     (2009.01)
(Continued)

(52) U.S. Cl.
CPC ......... *H04W 72/50* (2023.01); *H04W 64/006* (2013.01); *H04W 72/0446* (2013.01);
(Continued)

(58) Field of Classification Search
None
See application file for complete search history.

(56) References Cited

U.S. PATENT DOCUMENTS

| | | | |
|---|---|---|---|
| 2008/0146262 A1* | 6/2008 | Schwoerer | G01S 5/0289 455/500 |
| 2018/0368090 A1 | 12/2018 | Kadambar et al. | |

(Continued)

FOREIGN PATENT DOCUMENTS

| | | |
|---|---|---|
| CN | 110691361 A | 1/2020 |
| CN | 110784874 A | 2/2020 |

(Continued)

OTHER PUBLICATIONS

Spreadtrum Communications: "Discussion on DL Signals and Channels for NR-U", 3GPP TSG RAN WG1 #98b, R1-1910026, 3rd Generation Partnership Project (3GPP), Mobile Competence Centre, 650, Route Des Lucioles, F-06921, Sophia-Antipolis Cedex, France, vol. RAN WG1, No. Chongqing, China, Oct. 14, 2019-Oct. 20, 2019, Oct. 1, 2019, 6 Pages, XP051808013, 2. Discussion.

(Continued)

*Primary Examiner* — Xavier S Wong
(74) *Attorney, Agent, or Firm* — Holland & Hart LLP/Qualcomm

(57) ABSTRACT

This disclosure provides systems, methods, and apparatus, including computer programs encoded on computer storage media, for distance-based channel occupancy time (COT) sharing. In one aspect, a first device, such as a user equipment (UE), may determine an approximate distance between itself and a second device. The first device may receive a COT sharing configuration including a set of COT sharing parameters for sharing a COT of the communications link with the second device based on the distance between the two devices. The first device may determine conditions for sharing the COT based on the COT sharing configuration (Continued)

and the approximate distance between the two devices. Additionally, or alternatively, the first device may determine conditions for sharing the COT based on the COT sharing configuration and a power metric of communications between the two devices.

30 Claims, 20 Drawing Sheets

(51) Int. Cl.
  *H04W 72/0446* (2023.01)
  *H04W 72/11* (2023.01)
  *H04W 72/25* (2023.01)
  *H04W 74/00* (2009.01)
(52) U.S. Cl.
  CPC ............ *H04W 72/11* (2023.01); *H04W 72/25* (2023.01); *H04W 74/002* (2013.01)

(56) References Cited

U.S. PATENT DOCUMENTS

| | | | |
|---|---|---|---|
| 2019/0335456 A1 | 10/2019 | Yerramalli et al. | |
| 2020/0296635 A1* | 9/2020 | Rastegardoost | H04W 36/08 |
| 2022/0408415 A1* | 12/2022 | Ji | H04W 72/0446 |
| 2023/0300809 A1* | 9/2023 | Kusashima | H04W 74/02 |
| | | | 370/336 |

FOREIGN PATENT DOCUMENTS

| WO | WO-2018031068 A1 | 2/2018 |
|---|---|---|
| WO | WO-2019146986 A1 | 8/2019 |
| WO | WO-2019184711 A1 | 10/2019 |
| WO | WO-2019217007 A1 | 11/2019 |
| WO | WO-2019217852 A1 | 11/2019 |
| WO | WO-2020033689 A1 | 2/2020 |
| WO | WO-2020033721 A1 | 2/2020 |

OTHER PUBLICATIONS

Supplementary European Search Report—EP20931981—Search Authority—The Hague—Nov. 24, 2023.
International Search Report and Written Opinion—PCT/CN2020/085524—ISA/EPO—Jan. 19, 2021.
International Search Report and Written Opinion—PCT/CN2020/085605—ISA/EPO—Jan. 18, 2021.
LG Electronics: "Remaining Issues of Channel Access Procedure for NR-U", 3GPP Draft, 3GPP TSG RAN WG1 #100, R1-2000663, E-meeting, Feb. 24-Mar. 6, 2020, Mar. 6, 2020 (Mar. 6, 2020), 3 Pages, Section 1-3.
Nokia, et al., "On Support of UL Transmission with Configured Grants in NR-U", 3GPP TSG RAN WG1 Meeting #98bis, R1-1910595, Chongqing, P.R. China, Oct. 14-20, 2019, Oct. 20, 2019 (Oct. 20, 2019), 10 Pages, Section 1-3.
Samsung: "Discussion on HARQ Process Group Based HARQ-ACK Feedback", 3GPP TSG RAN WG1 #97, R1-1906926, May 17, 2019 (May 17, 2019), 4 Pages, the whole document.
Vivo: "Discussion on the Channel Access Procedures", 3GPP TSG RAN WG1#99, R1-1912012, Reno, USA, Nov. 18-22, 2019, Nov. 22, 2019 (Nov. 22, 2019), 10 Pages, Section 1-3, sections 2.4-2.6, 3.
Zte, et al., "Discussion on Configured Grant for NR-U", 3GPP TSG RAN WG1 Meeting #96Bis, R1-1903876, Xi'an, China, Apr. 8, 2019-Apr. 12, 2019, pp. 1-7.

* cited by examiner

DISTANCE-BASED CHANNEL OCCUPANCY TIME (COT) SHARING

CROSS REFERENCE

The present Application is a 371 national stage filing of International PCT Application No. PCT/CN2020/085605 by Zhang et al. entitled "DISTANCE-BASED CHANNEL OCCUPANCY TIME (COT) SHARING," filed Apr. 20, 2020, which is assigned to the assignee hereof, and which is expressly incorporated by reference in its entirety herein.

TECHNICAL FIELD

The following relates generally to wireless communications and more specifically to distance-based channel occupancy time (COT) sharing.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with other UEs on a sidelink in a vehicle-to-everything (V2X) wireless communications system. Some techniques for allocating resources on a sidelink in V2X system without introducing significant network congestion can be improved.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communications at a first device is described. The method may include identifying a channel occupancy time (COT) sharing configuration including a set of COT sharing parameters for sharing a COT of a communications link with a second device based on a distance between the first device and the second device, determining an approximation of the distance between the first device and the second device, and determining sharing conditions for sharing the COT based on the COT sharing configuration and the approximation of the distance between the first device and the second device.

Another innovative aspect of the subject matter described in this disclosure can be implemented in an apparatus for wireless communications at a first device. The apparatus may include a first interface, a second interface, and a processing system. The processing system may be configured to identify a COT sharing configuration including a set of COT sharing parameters for sharing a COT of a communications link with a second device based on a distance between the first device and the second device, determine an approximation of the distance between the first device and the second device, and determine sharing conditions for sharing the COT based on the COT sharing configuration and the approximation of the distance between the first device and the second device.

Another innovative aspect of the subject matter described in this disclosure can be implemented in another apparatus for wireless communications at a first device. The apparatus may include a processor, memory coupled with the processor, and instructions stored in the memory. The instructions may be executable by the processor to cause the apparatus to identify a COT sharing configuration including a set of COT sharing parameters for sharing a COT of a communications link with a second device based on a distance between the first device and the second device, determine an approximation of the distance between the first device and the second device, and determine sharing conditions for sharing the COT based on the COT sharing configuration and the approximation of the distance between the first device and the second device.

Another innovative aspect of the subject matter described in this disclosure can be implemented in another apparatus for wireless communications at a first device. The apparatus may include means for identifying a COT sharing configuration including a set of COT sharing parameters for sharing a COT of a communications link with a second device based on a distance between the first device and the second device, determining an approximation of the distance between the first device and the second device, and determining sharing conditions for sharing the COT based on the COT sharing configuration and the approximation of the distance between the first device and the second device.

Another innovative aspect of the subject matter described in this disclosure can be implemented in a non-transitory computer-readable medium storing code for wireless communications at a first device. The code may include instructions executable by a processor to identify a COT sharing configuration including a set of COT sharing parameters for sharing a COT of a communications link with a second device based on a distance between the first device and the second device, determine an approximation of the distance between the first device and the second device, and determine sharing conditions for sharing the COT based on the COT sharing configuration and the approximation of the distance between the first device and the second device.

In some implementations, identifying the COT sharing configuration, as implemented in the method, apparatuses, and non-transitory computer-readable medium described herein, can include operations, configurations, features, means, or instructions for receiving the COT sharing configuration via semi-static signaling.

In some examples of the method, apparatuses, and non-transitory computer-readable medium described herein, the semi-static signaling can include control signaling from a base station.

In some implementations, the method, apparatuses, and non-transitory computer-readable medium described herein may further include operations, configurations, features, means, or instructions for receiving, from the second device, one or more COT sharing parameters via dynamic signaling.

In some examples of the method, apparatuses, and non-transitory computer-readable medium described herein, the dynamic signaling can include a control information message.

In some examples of the method, apparatuses, and non-transitory computer-readable medium described herein, the one or more COT sharing parameters can include an energy detection (ED) threshold, a sharing duration, or a combination thereof.

In some examples of the method, apparatuses, and non-transitory computer-readable medium described herein, the one or more COT sharing parameters can be based on a database profile for the sharing of the COT.

In some implementations, the method, apparatuses, and non-transitory computer-readable medium described herein may further include operations, configurations, features, means, or instructions for determining the approximation of the distance between the first device and the second device satisfies a communication range threshold value.

In some implementations, the method, apparatuses, and non-transitory computer-readable medium described herein may further include operations, configurations, features, means, or instructions for receiving, from the second device, a control information message, decoding the control information message, and determining the communication range threshold value based on the decoded control information message.

In some examples of the method, apparatuses, and non-transitory computer-readable medium described herein, the approximation of the distance between the first device and the second device may be less than or equal to the communication range threshold value.

In some examples of the method, apparatuses, and non-transitory computer-readable medium described herein, the communication range threshold value may be configured for the sharing of the COT.

In some examples of the method, apparatuses, and non-transitory computer-readable medium described herein, the COT may be shared with the second device based on the approximation of the distance satisfying the communication range threshold value.

In some implementations, determining the approximation of the distance between the first device and the second device, as implemented in the method, apparatuses, and non-transitory computer-readable medium described herein, can include operations, configurations, features, means, or instructions for receiving, from the second device, a control information message, where the control information message includes a zone identifier associated with the second device, and estimating the distance between the first device and the second device based on the zone identifier associated with the second device in the control information message and a location of the first device.

In some implementations, determining the sharing conditions for sharing the COT, as implemented in the method, apparatuses, and non-transitory computer-readable medium described herein, can include operations, configurations, features, means, or instructions for determining a transmission type that can be shared within the COT, a duration for the sharing of the COT, or both corresponding to the approximation of the distance and an energy detection threshold used by the second device.

In some implementations, the method, apparatuses, and non-transitory computer-readable medium described herein may further include operations, configurations, features, means, or instructions for receiving, from the second device, an indication of the energy detection threshold used by the second device.

In some implementations, the method, apparatuses, and non-transitory computer-readable medium described herein may further include operations, configurations, features, means, or instructions for determining to not share the COT with the second device based on the approximation of the distance exceeding a threshold value and the ED threshold exceeding an ED threshold value.

In some implementations, the method, apparatuses, and non-transitory computer-readable medium described herein may further include operations, configurations, features, means, or instructions for receiving, from the second device, a message, and determining a power metric for the received message, where the sharing conditions may be determined based on the determined power metric.

In some examples of the method, apparatuses, and non-transitory computer-readable medium described herein, the power metric includes a pathloss measurement, a reference signal received power (RSRP) measurement, a reference signal power for the message, or a combination thereof.

In some implementations, the method, apparatuses, and non-transitory computer-readable medium described herein may further include operations, configurations, features, means, or instructions for transmitting an indication of the sharing conditions, where the indication includes a message of one or more COT sharing parameters of the set of COT sharing parameters for the sharing of the COT.

In some implementations, the method, apparatuses, and non-transitory computer-readable medium described herein may further include operations, configurations, features, means, or instructions for sharing the COT with a set of devices, the set of devices including at least the second device.

In some examples of the method, apparatuses, and non-transitory computer-readable medium described herein, the COT sharing configuration may be designed for a relay operation.

In some examples of the method, apparatuses, and non-transitory computer-readable medium described herein, the set of COT sharing parameters can include a sharing duration, one or more distance thresholds, an ED threshold, a type of transmission for the first device to use during the COT, an RSRP threshold value, or a combination thereof.

In some examples of the method, apparatuses, and non-transitory computer-readable medium described herein, the communications link can include a PC5 interface link, a sidelink, or a combination thereof.

In some examples of the method, apparatuses, and non-transitory computer-readable medium described herein, the first device and the second device can include a user equipment (UE), an access point, a base station, or a combination thereof.

Another innovative aspect of the subject matter described in this disclosure can be implemented in a method of wireless communications at a second device. The method may include identifying a COT sharing configuration including a set of COT sharing parameters for sharing a COT of a communications link with a first device based on an approximate distance between the first device and the second device, transmitting, to the first device, the COT sharing configuration, and receiving, from the first device, an indication of sharing conditions for the sharing of the COT with the first device, the sharing conditions based on the COT sharing configuration and the approximate distance between the first device and the second device.

Another innovative aspect of the subject matter described in this disclosure can be implemented in an apparatus for wireless communications at a second device. The apparatus may include a first interface, a second interface, and a processing system. The processing system may be configured to identify a COT sharing configuration including a set of COT sharing parameters for sharing a COT of a communications link with a first device based on an approximate distance between the first device and the second device. Additionally, the first interface can be configured to obtain an indication of sharing conditions for the sharing of the COT with the first device, the sharing conditions based on the COT sharing configuration and the approximate distance between the first device and the second device.

Another innovative aspect of the subject matter described in this disclosure can be implemented in an apparatus for wireless communications at a second device. The apparatus may include a processor, memory coupled with the processor, and instructions stored in the memory. The instructions may be executable by the processor to cause the apparatus to identify a COT sharing configuration including a set of COT sharing parameters for sharing a COT of a communications link with a first device based on an approximate distance between the first device and the second device, transmit, to the first device, the COT sharing configuration, and receive, from the first device, an indication of sharing conditions for the sharing of the COT with the first device, the sharing conditions based on the COT sharing configuration and the approximate distance between the first device and the second device.

Another innovative aspect of the subject matter described in this disclosure can be implemented in another apparatus for wireless communications at a second device. The apparatus may include means for identifying a COT sharing configuration including a set of COT sharing parameters for sharing a COT of a communications link with a first device based on an approximate distance between the first device and the second device, transmitting, to the first device, the COT sharing configuration, and receiving, from the first device, an indication of sharing conditions for the sharing of the COT with the first device, the sharing conditions based on the COT sharing configuration and the approximate distance between the first device and the second device.

Another innovative aspect of the subject matter described in this disclosure can be implemented in a non-transitory computer-readable medium storing code for wireless communications at a second device. The code may include instructions executable by a processor to identify a COT sharing configuration including a set of COT sharing parameters for sharing a COT of a communications link with a first device based on an approximate distance between the first device and the second device, transmit, to the first device, the COT sharing configuration, and receive, from the first device, an indication of sharing conditions for the sharing of the COT with the first device, the sharing conditions based on the COT sharing configuration and the approximate distance between the first device and the second device.

In some implementations, the method, apparatuses, and non-transitory computer-readable medium described herein may further include operations, configurations, features, means, or instructions for determining, from the indication of the sharing conditions, one or more COT sharing parameters to enable the first device to use the COT after the second device may be finished using the COT.

In some examples of the method, apparatuses, and non-transitory computer-readable medium described herein, the one or more COT sharing parameters can include a starting time for the first device to begin using the COT, a type of transmission the first device may be permitted to transmit in the COT, or a combination thereof.

In some implementations, identifying the COT sharing configuration, as implemented in the method, apparatuses, and non-transitory computer-readable medium described herein, can include operations, configurations, features, means, or instructions for receiving the COT sharing configuration via semi-static signaling.

In some examples of the method, apparatuses, and non-transitory computer-readable medium described herein, the semi-static signaling can include control signaling from a base station.

In some implementations, the method, apparatuses, and non-transitory computer-readable medium described herein may further include operations, configurations, features, means, or instructions for transmitting, to the first device, one or more COT sharing parameters via dynamic signaling.

In some implementations, the method, apparatuses, and non-transitory computer-readable medium described herein may further include operations, configurations, features, means, or instructions for determining the one or more COT sharing parameters based on a database profile for the sharing of the COT.

In some examples of the method, apparatuses, and non-transitory computer-readable medium described herein, the dynamic signaling can include a control information message.

In some examples of the method, apparatuses, and non-transitory computer-readable medium described herein, the one or more COT sharing parameters can include an ED threshold, a sharing duration, or a combination thereof.

In some implementations, the method, apparatuses, and non-transitory computer-readable medium described herein may further include operations, configurations, features, means, or instructions for transmitting, to the first device, a control information message, where the control information message includes a zone identifier associated with the second device.

In some examples of the method, apparatuses, and non-transitory computer-readable medium described herein, the COT sharing configuration may be designed for a relay operation.

In some examples of the method, apparatuses, and non-transitory computer-readable medium described herein, the set of COT sharing parameters can include a sharing duration, one or more distance thresholds, an ED threshold, a type of transmission for the first device to use during the COT, an RSRP threshold value, or a combination thereof.

In some examples of the method, apparatuses, and non-transitory computer-readable medium described herein, the communications link can include a PC5 interface link, a sidelink, or a combination thereof.

In some examples of the method, apparatuses, and non-transitory computer-readable medium described herein, the first device and the second device can include a UE, an access point, a base station, or a combination thereof.

Another innovative aspect of the subject matter described in this disclosure can be implemented in a method of wireless communications at a base station. The method may include identifying a COT sharing configuration including a set of COT sharing parameters for sharing a COT of a communications link between a first device and a second device based on an approximate distance between the first device and the second device and transmitting an indication of the COT sharing configuration, the indication includes a downlink message of one or more COT sharing parameters of the set of COT sharing parameters for the sharing of the COT.

Another innovative aspect of the subject matter described in this disclosure can be implemented in an apparatus for wireless communications at a base station. The apparatus may include a first interface, a second interface, and a processing system. The processing system may be configured to identify a COT sharing configuration including a set of COT sharing parameters for sharing a COT of a communications link between a first device and a second device based on an approximate distance between the first device and the second device. Additionally, the first interface can be configured to output an indication of the COT sharing configuration, the indication includes a downlink message of one or more COT sharing parameters of the set of COT sharing parameters for the sharing of the COT.

Another innovative aspect of the subject matter described in this disclosure can be implemented in another apparatus for wireless communications at a base station. The apparatus may include a processor, memory coupled with the processor, and instructions stored in the memory. The instructions may be executable by the processor to cause the apparatus to identify a COT sharing configuration including a set of COT sharing parameters for sharing a COT of a communications link between a first device and a second device based on an approximate distance between the first device and the second device and transmit an indication of the COT sharing configuration, the indication includes a downlink message of one or more COT sharing parameters of the set of COT sharing parameters for the sharing of the COT.

Another innovative aspect of the subject matter described in this disclosure can be implemented in another apparatus for wireless communications at a base station. The apparatus may include means for identifying a COT sharing configuration including a set of COT sharing parameters for sharing a COT of a communications link between a first device and a second device based on an approximate distance between the first device and the second device and transmitting an indication of the COT sharing configuration, the indication includes a downlink message of one or more COT sharing parameters of the set of COT sharing parameters for the sharing of the COT.

Another innovative aspect of the subject matter described in this disclosure can be implemented in a non-transitory computer-readable medium storing code for wireless communications at a base station. The code may include instructions executable by a processor to identify a COT sharing configuration including a set of COT sharing parameters for sharing a COT of a communications link between a first device and a second device based on an approximate distance between the first device and the second device and transmit an indication of the COT sharing configuration, the indication includes a downlink message of one or more COT sharing parameters of the set of COT sharing parameters for the sharing of the COT.

In some implementations, the method, apparatuses, and non-transitory computer-readable medium described herein may further include operations, configurations, features, means, or instructions for receiving, from the first device, an indication of sharing conditions for the sharing of the COT between the first device and the second device, the sharing conditions based on the approximate distance between the first device and the second device.

In some implementations, the method, apparatuses, and non-transitory computer-readable medium described herein may further include operations, configurations, features, means, or instructions for transmitting, to the first device, the second device, or both, the COT sharing configuration via semi-static signaling.

In some examples of the method, apparatuses, and non-transitory computer-readable medium described herein, the COT sharing configuration may be designed for a relay operation.

In some examples of the method, apparatuses, and non-transitory computer-readable medium described herein, the set of COT sharing parameters can include a sharing duration, one or more distance thresholds, an ED threshold, a type of transmission for the first device to use during the COT, an RSRP threshold value, or a combination thereof.

In some examples of the method, apparatuses, and non-transitory computer-readable medium described herein, the communications link can include a PC5 interface link, a sidelink, or a combination thereof.

In some examples of the method, apparatuses, and non-transitory computer-readable medium described herein, the first device and the second device can include a UE, an access point, a base station, or a combination thereof.

Details of one or more implementations of the subject t matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
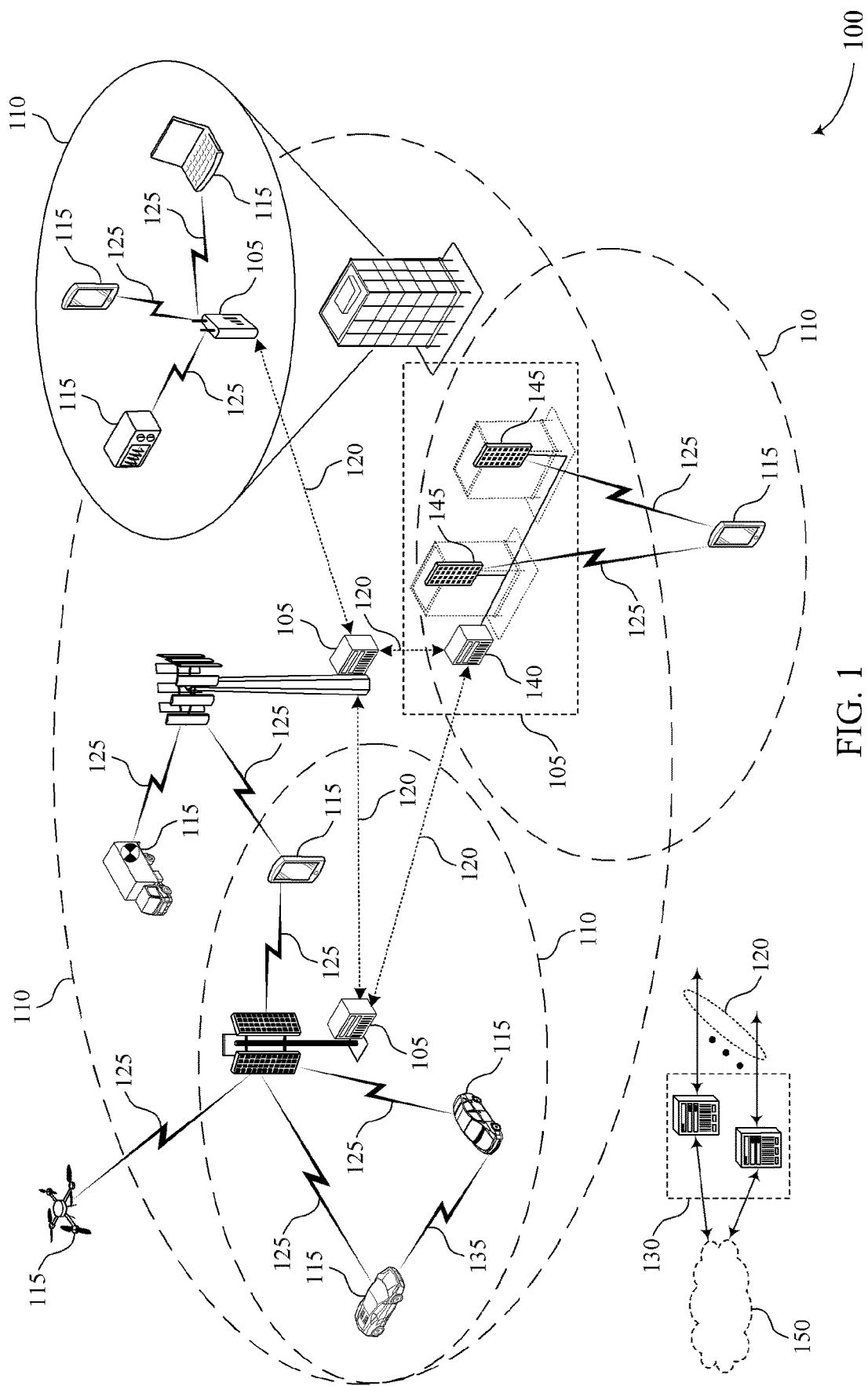
FIG. 1 illustrates an example of a system for wireless communications that supports distance-based channel occupancy time (COT) sharing.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some wireless communications systems (such as, unlicensed spectrum communications), a device may perform a listen-before-talk (LBT) procedure (such as, a clear channel assessment (CCA)) to determine whether a channel or frequency is available prior to using the channel/frequency for communications. For example, the LBT procedure may include the device using an energy detection (ED) threshold to determine if the channel is currently occupied, such that if a detected energy is below the ED threshold, the channel is determined to be available, and if the detected energy exceeds the ED threshold, the channel is determined to be occupied. If the LBT procedure indicates the channel/frequency is available, the device may be granted access to the channel/frequency for a certain amount of time before the channel/frequency is again potentially available for other devices to use. This certain amount of time may be referred to as a channel occupancy time (COT), where the device is occupying (such as, using) the channel/frequency. In some implementations, the COT may be shared between uplink and downlink communications between the device and a base station, as an example. However, it may be beneficial to expand how a COT can be shared between different devices.

The techniques described herein may enable two devices to share a COT based on a distance between the two devices. For example, a receiving device (such as, a first device) may estimate a distance between itself and a transmitting device (such as, a second device) based on signaling from the transmitting device. Based on this estimated distance, the receiving device may determine a set of sharing parameters from a COT sharing configuration for sharing the COT with the transmitting device once the receiving device is done using the COT. For example, the COT sharing configuration may include sharing parameters such as a sharing duration, distance thresholds, ED thresholds, types of transmissions that the transmitting device may transmit in the shared COT, reference power thresholds, or a combination thereof. Accordingly, after estimating the distance, the receiving device may then find the corresponding sharing parameters for that distance in the COT sharing configuration and may determine whether the transmitting device can share the COT or not (such as, sharing conditions) based on the ED threshold used by the transmitting device. If the transmitting device is allowed to share the COT, the receiving device may then indicate how the transmitting device is allowed to share the COT (such as, when the transmitting device is allowed to start using the COT, which transmissions can be sent, etc.).

Additionally, or alternatively, the receiving device may determine whether the transmitting device can share the COT based on a reference signal received power (RSRP) threshold, a pathloss measurement, a reference signal power measurement, etc. For example, the receiving device may determine a metric (such as, the RSRP, pathloss, power measurement, etc.) from a signal transmitted by the transmitting device. Subsequently, based on these measurements, the receiving device may determine the sharing parameters to allow the transmitting device to use the COT. In some implementations, the COT sharing configuration or sharing parameters may be configured via semi-static signaling (such as, from a base station) or via dynamic signaling (such as, from the transmitting device). Additionally, the COT sharing may be implemented between two UEs on a sidelink connection (such as, via a PC5 interface), between an access point and a UE, between two access points, etc. In some implementations, the COT sharing may be used for a relay operation.

Particular implementations of the subject matter described in this disclosure may be implemented to realize one or more of the following potential advantages. Providing additional techniques for COT sharing may increase utilization of a wireless communications spectrum. However, in some implementations, increasing a number of transmissions that occur in a wireless communications system may increase the network congestion. By considering a distance between two devices when determining whether to share a COT, devices in the wireless communications network may apply aggressive transmission parameters in an effort to more efficiently share the COT based on similar interferences being observed by device that are in closer proximity to each other.

FIG. 1 illustrates an example of a wireless communications system 100 that supports distance-based COT sharing. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (such as mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (such as core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (such as via an S1, N2, N3, or another interface). The base stations 105 may communicate with one another over the backhaul links 120 (such as via an X2, Xn, or other interface) either directly (such as directly between base stations 105), or indirectly (such as via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (such as in a carrier aggregation configuration), a carrier also may have acquisition signaling or control signaling that coordinates operations for other carriers. A carrier may be associated with a frequency channel (such as an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (such as of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (such as in an FDD mode) or may be configured to carry downlink and uplink communications (such as in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (such as 1.4, 3, 5, 10, 15, 20, 40, or 80 megahertz (MHz)). Devices of the wireless communications system 100 (such as the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (such as a sub-band, a BWP) or all of a carrier bandwidth.

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (such as a duration of one modulation symbol) and one subcarrier, where the symbol period and subcarrier spacing are inversely related. The number of bits carried by each resource element may depend on the modulation scheme (such as the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (such as spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/$ ($\Delta f_{max}$–$N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some examples, a frame may be divided (such as in the time domain) into subframes, and each subframe may be further divided into a number of slots. Alternatively, each frame may include a variable number of slots, and the number of slots may depend on subcarrier spacing. Each slot may include a number of symbol periods (such as depending on the length of the cyclic prefix prepended to each symbol period). In some wireless communications systems 100, a slot may further be divided into multiple mini-slots containing one or more symbols. Excluding the cyclic prefix, each symbol period may contain one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some examples, the TTI duration (such as the number of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a number of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (such as over a carrier) and may be associated with an identifier for distinguishing neighboring cells (such as a physical cell identifier (PCID), a virtual cell identifier (VCID), or others). In some examples, a cell also may refer to a geographic coverage area 110 or a portion of a geographic coverage area 110 (such as a sector) over which the logical communication entity operates. Such cells may range from smaller areas (such as a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (such as several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (such as licensed, unlicensed) frequency bands as macro cells. Small cells may provide unrestricted access to the UEs 115 with service subscriptions with the network provider or may provide restricted access to the UEs 115 having an association with the small cell (such as the UEs 115 in a closed subscriber group (CSG), the UEs 115 associated with users in a home or office). A base station 105 may support one or multiple cells and also may support communications over the one or more cells using one or multiple component carriers.

In some examples, a carrier may support multiple cells, and different cells may be configured according to different protocol types (such as MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In some other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (such as via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (such as a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (such as according to narrowband communications), or a combination of these techniques. For example, some UEs 115 may be configured for operation using a narrowband protocol type that is associated with a defined portion or range (such as set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (such as mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 also may be able to communicate directly with other UEs 115 over a device-to-device (D2D) communication link 135 (such as using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other examples, D2D communications are carried out between the UEs 115 without the involvement of a base station 105.

In some systems, the D2D communication link 135 may be an example of a communication channel, such as a sidelink communication channel, between vehicles (such as UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (such as base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (such as radio heads and ANCs) or consolidated into a single network device (such as a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (such as less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (such as from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (such as LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (such as the same codeword) or different data streams (such as different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (such as a base station 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (such as antenna panels) to conduct beamforming operations for directional communications with a UE 115. Some signals (such as synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (such as by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (such as a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (such as by a base station 105 or a UE 115) may be performed using multiple beam directions, and the device may use a combination of digital precoding or radio frequency beamforming to generate a combined beam for transmission (such as from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (such as a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (such as a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (such as for identifying a beam direction for subsequent transmission or reception by the UE 115) or for transmitting a signal in a single direction (such as for transmitting data to a receiving device).

A receiving device (such as a UE 115) may try multiple receive configurations (such as directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (such as different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (such as when receiving a data signal). The single receive configuration may be aligned in a beam direction determined based on listening according to different receive configuration directions (such as a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (such as using a cyclic redundancy check (CRC)), forward error correction (FEC), and retransmission (such as automatic repeat request (ARQ)). HARQ may improve throughput at the MAC layer in poor radio conditions (such as low signal-to-noise conditions). In some examples, a device may support same-slot HARQ feedback, where the device may provide HARQ feedback in a specific slot for data received in a previous symbol in the slot. In other examples, the device may provide HARQ feedback in a subsequent slot, or according to some other time interval.

In some implementations, a wireless communications system using unlicensed radio frequency spectrum bands may support devices to share a COT. When a wireless device (such as, a UE 115) successfully performs a clear channel assessment (CCA), such as an LBT, the wireless device is given a COT to perform wireless communications. The wireless device may share the COT with another wireless device, which may improve medium access within the COT from one node to another node.

For example, the wireless communications system 100 may support uplink and downlink COT sharing. A base station 105 may acquire a COT with an extended CCA and share the COT with multiple UEs 115 for the UEs 115 to transmit uplink signals. Within the COT acquired by the base station 105, a UE 115 may use a single shot CCA for the uplink transmission. In some implementations, a UE 115 may not perform an LBT to begin an uplink transmission in the shared COT. In some implementations, the type of LBT performed by the UE 115 may be based on certain conditions. For example, a Category 2 LBT may be used for a certain durations of downlink-to-uplink gaps (such as, between gaps of approximately 16 microseconds (µs) and 25 µs or gaps beyond 25 µs within a base station acquired COT), and a Category 1 LBT may be used for smaller downlink-to-uplink gaps (such as, gaps shorter than approximately 16 µs).

An LBT procedure may include different Categories for attempting to access an unlicensed frequency band. For example, a Category 1 LBT may enable a UE 115 (or a different device) to transmit a message on the unlicensed frequency band after a switching gap of approximately 16 µs. A Category 2 LBT may include an LBT without a random back-off (RBO), in which a CCA period (that is, a time duration where a device listens to the unlicensed frequency band to determine if signaling is present or not) is deterministic (for example, a duration of time that the channel is sensed to be idle or not before a transmitting entity transmits may be deterministic, such as fixed to 25 µs). A Category 3 LBT may include an LBT with an RBO with a contention window of a fixed size, in which an extended CCA period is drawn by a random number within a fixed contention window (that is, a random number is used in the LBT procedure to determine the duration of time that the channel is sensed to be idle or not before the transmitting entity transmits on the channel). A Category 4 LBT may include an LBT with an RBO with a contention window of a variable size, in which an extended CCA period is drawn by a random number within a contention window, whose size can vary based on channel dynamics (that is, the transmitting entity can vary the size of the contention window when drawing a random number, and the random number is used in the LBT procedure to determine the duration of time that the channel is sensed to be idle before the transmitting entity transmits on the channel). The different Categories may be used for different scenarios. For example, the Category 4 LBT may be used by a base station 105 or a UE 115 to initiate a COT for data transmissions, while a base station 105 may use the Category 2 LBT for signaling such as discovery reference signals.

In some implementations, the wireless communications system 100 may support uplink-to-downlink COT sharing. For example, a UE 115 may acquire the COT and share the COT with a base station 105. In some implementations, the channel occupancy acquired by the UE 115 may be for a group common uplink shared channel or a scheduled uplink transmission. The base station 105 may transmit control signaling, broadcast signals, or various channels for multiple UEs 115, including at least the UE 115 that initiated the channel occupancy. The UE 115 may apply an ED threshold configured by the base station 105 when initiating a channel occupancy that is to be shared with the base station 105. In some implementations, the energy detection threshold may be configured via RRC signaling. If the energy detection threshold is not configured, the transmission of a base station 105 in a UE-initiated COT may include a limited number of OFDM symbols. For example, the base station 105 may send up to 2, 4, or 8 OFDM symbols for, respectively, 15 kHz, 30 kHz, and 60 kHz subcarrier spacing for control signaling, broadcast signaling, or data or control channels. If the base station 105 cannot determine the presence, or lack thereof, of Wi-Fi, the energy detection threshold configured by the base station 105 may be determined based on the maximum transmit power of the base station 105. In some implementations, similar to downlink-to-uplink COT sharing, a Category 2 LBT may be used by a base station 105, for uplink-to-downlink gap durations between approximately 16 µs and 25 µs or beyond 25 µs within a UE acquired COT, and a Category 1 LBT may be used for uplink-to-downlink gap durations less than or equal to approximately 16 µs.

In some examples, the wireless communications system 100 may support group common uplink-to-downlink COT sharing. When an uplink-to-downlink sharing energy detection threshold is configured, the base station 105 also may configure a table for sharing parameters. Each row of the table may include a number of slots where downlink transmissions can be assumed within the UE-initiated COT, a downlink offset (such as, in a number of slots) from the end of the slot indicating a starting slot of the downlink transmission, and a channel access priority class of the traffic. In some implementations, one row of the table may indicate no COT sharing information. In some implementations, the UE 115 may include an indication in uplink control information (UCI) for the COT sharing. If the uplink-to-downlink COT sharing energy detection threshold is not configured, group common uplink control information may include a one-bit COT sharing indication. The one-bit COT sharing indication may indicate if TTI (such as, a slot or symbol) n+X is an applicable slot for uplink-to-downlink sharing. In some implementations, the value for X may be configured by the base station 105 as part of RRC configuration. X may be a number of symbols from the end of the slot where the group common uplink control information is transmitted.

In some implementations, the wireless communications system 100 may support V2X communications. In some V2X systems, there may be two resource allocation modes for sidelink communications (such as, over a PC5 interface). In a first mode, a base station 105 may allocate resources for sidelink communications between UEs 115. In a second mode, the UEs 115 may autonomously select sidelink resources. The signaling on the sidelink may be the same between the two modes. In some implementations, from the receiver perspective, there may not be a difference between the modes, as the transmitter or base station 105 may select the resources. In the first mode, a base station 105 may provide a dynamic grant or activate a configured sidelink grant for sidelink communications. In the first mode, sidelink feedback may be reported back to the base station 105 by the transmitting UE 115.

In the second mode, sidelink communications may be scheduled by sidelink control information (SCI). SCI may be implemented to have one or more stages. For example, in a first stage, SCI is transmitted on a physical sidelink control channel (PSCCH) and includes information for resource allocation and decoding second stage SCI. First stage SCI may include at least priority, a physical sidelink shared channel (PSSCH) resource assignment, a resource reservation period (such as, if enabled), a PSSCH demodulation reference signal pattern (such as, if multiple patterns are configured), second stage SCI format (such as, size of the second SCI), an amount of resources for the second SCI, a number of PSSCH demodulation reference signal ports, a modulation and coding scheme, etc. The second stage SCI may be transmitted on PSCCH and include information for decoding PSSCH. The second stage SCI may include a 16-bit L1 destination ID, an 8-bit L1 source ID, a HARQ process ID, a new data indicator, redundancy version, etc.

In some implementations, a UE 115 may measure channel occupancy of a wireless channel. The channel occupancy may indicate whether, for example, Wi-Fi devices are on an unlicensed radio frequency spectrum band, whether the unlicensed radio frequency spectrum band is overloaded, etc. In some implementations, the UE 115 may measure a received signal strength indicator (RSSI) of the wireless channel. RSSI may include the linear average of total received power (such as, in Watts) from all sources over a configured measurement resource. For example, the measurement resource may span a set of configured OFDM symbols and a configured measurement bandwidth over N resource blocks (such as, the LBT bandwidth) with the center frequency of the configured absolute radio frequency channel number. In some implementations, the RSSI measurement may measure co-channel serving and non-serving cells, adjacent channel interference, thermal noise, etc. Higher layers may configure the measurement bandwidth, measurement duration, and which OFDM symbols are to be measured by the UE 115. The channel occupancy may be measured by comparing the RSSI with a configured threshold.

A UE 115 may take the RSSI and channel occupancy measurements and report the RSSI and channel occupancy measurements to the base station 105. Based on the measurements and reports, the base station 105 may determine whether a channel is congested or not and may configure the UE 115 to a different bandwidth part or handover the UE 115 to a different frequency. In some implementations, such as for NR unlicensed systems, handover or mobility decisions for the UE 115 may be determined by the base station 105.

Some V2X systems may use a channel busy ratio (CBR) as a metric for congestion control. Sidelink RSSI measurements may be used for CBR estimation. In some implementations, sidelink RSSI may be the linear average of the total received power observed in the configured sub-channel in OFDM symbols of a slot configured for PSCCH and PSSCH, starting from the second OFDM symbol. The sidelink CBR measured in slot n may be the portion of sub-channels in the resource pool whose sidelink RSSI measured by the UE 115 exceed a configured threshold sensed over a CBR measurement window. The CBR measurement window may span from [n−a, n−1], where a is equal to 100 or 100*24 slots, according to higher layer parameter "timeWindowSize-CBR."

In some implementations, congestion control in V2X systems may restrict one or more transmission parameters. For example, congestion control may restrict modulation and coding scheme (MCS) indices and MCS tables, a number of sub-channels per transmission, a number of retransmissions, a transmission power, or any combination thereof. For example, if the base station 105, or in some implementations the transmitting UE 115, determines that a channel is too congested, the base station 105, or transmitting UE 115, may change one of these parameters to reduce congestion on the channel. For example, by reducing a number of retransmissions, each device may perform fewer transmissions, reducing the congestion. In some implementations, UE speed (such as, absolute UE speed) may restrict transmission parameters.

Additionally, in some implementations, general sidelink communications for non-V2X applications may not be defined (such as, sidelink communications for public safety, as an example, may not be defined). Sidelink communications over the PC5 interface also may enable relay operations. For example, both layer 2 (L2) and layer 3 (L3) relay operations may be used over a sidelink via the PC5 interface. In some implementations, sidelink communications between two (2) UEs 115 (such as, or other wireless devices) may occur in an unlicensed spectrum such that usage of a licensed spectrum is not incurred. As such, COT sharing from UE to UE may allow more efficient medium access in sidelink communications for unlicensed operations. However, such a COT sharing on sidelink communications may not be defined.

The wireless communications system 100 may support distance-based COT sharing. In some implementations, COT sharing between two devices (such as, nodes) may depend on different interferences the two devices experience. For example, devices that are closer together may experience similar interferences while devices that are farther apart may experience different interferences. Accordingly, the closer two devices may indicate more aggressive COT sharing parameters (such as, two devices may be able to share a higher amount of a COT for a higher range of types of transmissions if the two devices are closer together based on similar interferences occurring for both devices). As described herein, a COT sharing configuration may be identified by two devices (such as, signaled by a base station, loaded into the devices, etc.) that is distance-based. One or both devices may approximate a distance between each other, where the approximated distance and an ED level used by the devices correspond to different COT sharing parameters (such as, duration that the COT can be shared, types of transmissions that can be sent during the shared duration, etc.) in the COT sharing configuration. Additionally, or alternatively, the devices may determine to share and how to share the COT based on metrics of the sidelink between the two devices, such as an RSRP measurement, a pathloss, a power measurement, etc.

Figure 2:
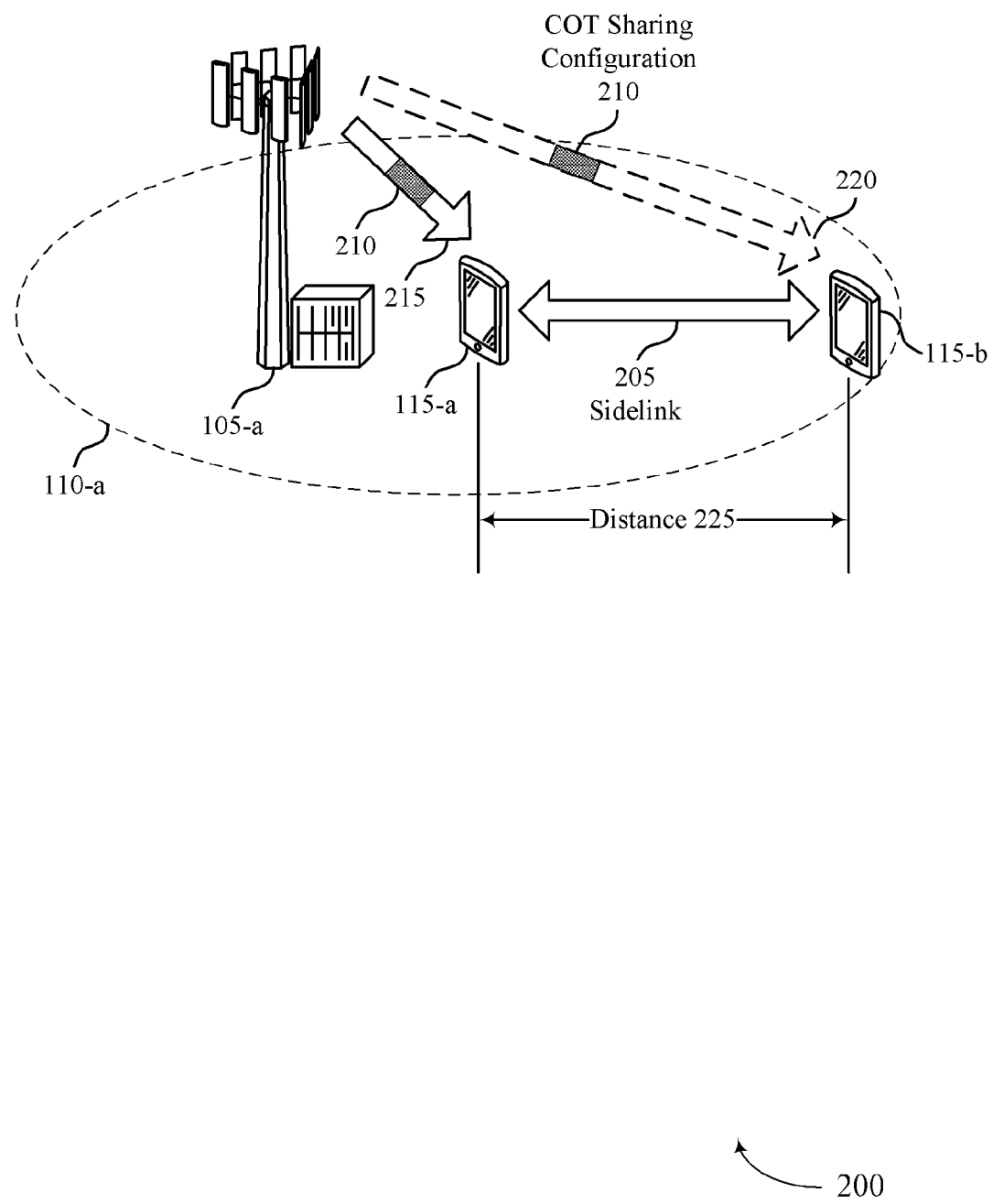
FIG. 2 illustrates an example of a wireless communications system that supports distance-based COT sharing.

FIG. 2 illustrates an example of a wireless communications system 200 that supports distance-based COT sharing. In some examples, wireless communications system 200 may implement aspects of wireless communications system 100. The wireless communications system 200 may include base station 105-a, which may be an example of a base station 105 as described herein, and UE 115-a and UE 115-b, which may each be an example of a UE 115 described herein. Additionally, base station 105-a may include a geographical coverage area 110-a that represents an area that base station 105-a is capable of having communications with different devices (such as, UEs 115) that are located within geographical coverage area 110-a. While some examples of techniques for distance-based COT sharing described herein are described as UE-to-UE distance-based COT sharing, other devices may implement these techniques as well. For example, base stations 105, access points, relay nodes, or other types of wireless nodes, may implement techniques similar to UE 115-a and UE 115-b for sharing a COT.

The wireless communications system 200 may support communications over unlicensed radio frequency spectrum. Using unlicensed radio frequency spectrum bands may enable sidelink communications between two devices without incurring the usage of licensed spectrum. In some implementations, the wireless communications system 200 may support COT sharing, such as uplink-to-downlink or downlink-to-uplink COT sharing and group common uplink-to-downlink COT sharing.

UE 115-a and UE 115-b may communicate on a sidelink 205. Some wireless communications systems may use a sidelink, such as the sidelink 205, for D2D communications, V2X communications, etc. For example, some wireless communications systems may use a sidelink to send public safety messages, such as sending a warning if two vehicles are predicted to collide in a V2X system. Some sidelinks, such as the sidelink 205, may enable relay operation. For example, sidelink communications on PC5 may be used to convey data and control signaling along nodes. For example, base station 105-a may send, to UE 115-a, information for UE 115-b, and UE 115-a may operate as a relay node to send the information to UE 115-b on the sidelink 205.

In some implementations, the wireless communications system 200 may support UE-to-UE COT sharing, which may provide enhanced medium access for sidelink communications. For examples, for load-based equipment (LBE), COT sharing may enable one node to share a COT with other nodes so the other nodes do not perform a Category 4 LBT. This may improve the chances of transmitting for the other nodes. For frame-based equipment (FBE), a second node may join a COT acquired by a first node without accessing the medium in the beginning of each fixed frame period (FFP), which may provide the second node additional transmission opportunities. However, in some implementations, the wireless communications system 200 may already have a high channel occupancy and be congested. In some implementations, COT sharing techniques, such as the UE-to-UE COT sharing, may result in additional transmissions, further increasing medium congestion.

To support multiple device-to-device COT sharing techniques without greatly increasing network congestion, the wireless communications system 200 may support techniques for distance-based COT sharing. The distance-based COT sharing may be implemented for multiple different types of COT sharing, such as UE-to-UE COT sharing, base station-and-UE COT sharing, UE-to-base station COT sharing, base station-to-base station COT sharing, as well as relay node operation.

For COT sharing between two nodes (such as, UE-to-UE, UE-to-base station, base station-to-base station, access point-to-access point, access point-to-UE, etc.), an issue for inhibiting the COT sharing may include the two nodes experiencing different interference scenario, for example, when the two nodes are not geographically close. Accordingly, linking the COT sharing with a distance between the nodes may mitigate this issue. For example, nodes that are close to each other may share the COT more efficiently with each other when compared with two nodes that are far apart. Accordingly, the distance-based COT sharing techniques described herein may incorporate a COT sharing configuration 210 that approximates a distance 225 between the two nodes to determine whether the two nodes can share the COT and, if the COT can be shared, to determine parameters for the COT sharing. That is, the COT sharing configuration 210 may include one or more COT sharing parameters for sharing a COT of a communications link between a first device and a second device based on an approximate distance (for example, the distance 225) between the first device and the second device.

For the distance-based COT sharing, the one or more COT sharing parameters of the COT sharing configuration 210 may be a function of the distance 225 (such as, an approximate distance between a transmitting device and a receiving device, such as a distance between UE 115-*a* and UE 115-*b*). In some implementations, UE 115-*a* may acquire a COT based on performing an LBT (such as, or similar CCA procedure) to identify that a channel/frequency is available for communicating with base station 105-*a*. However, UE 115-*a* may not need the entire allocated length of the COT, and as such, UE 115-*a* may share the COT with UE 115-*b* after UE 115-*a* is done using the COT based on the COT sharing configuration 210 (such as, to enable UE 115-*b* to use the COT). In such scenarios and as described herein, UE 115-*a* may be referred to as a transmitting device (such as, a second device), and UE 115-*b* may be referred to as a receiving device (such as, a first device).

As described herein, the two nodes (such as, UE 115-*a* and UE 115-*b*, a first device and a second device, a receiving device and a transmitting device, etc.) may use the COT sharing if the distance 225 satisfies a (such as, is smaller or equal to) a threshold value (such as, a minimum communication range requirement). If the distance 225 does not satisfy the threshold value, the two nodes may not share the COT (such as, UE 115-*a* may not share an acquired COT with UE 115-*b*). The threshold value (such as, used minimum communication range requirement) for the COT sharing may be known by the two nodes after decoding an SCI message (such as, second stage SCI). Additionally, a location of UE 115-*b* (such as, second device, receiving device, etc.) may be indicated by the SCI message (such as, second stage SCI). For example, base station 105-*a* may configure different zones with respect to geographical coverage area 110-*a*, where each zone has a respective zone identifier (ID), and a zone ID associated with the location of UE 115-*b* may be indicated by the SCI message. Subsequently, UE 115-*a* may estimate (such as, approximate) the distance 225 (such as, transmitter-receiver distance, distance between two nodes, etc.) based on the location of UE 115-*a* (such as, its own location) and the location of UE 115-*b* indicated by the zone ID. The zone ID may represent an approximate location of UE 115-*b*, such that UE 115-*a* is able to approximate the distance 225 between itself and UE 115-*b*.

Accordingly, based on the distance 225 (for example, approximate distance), UE 115-*a* and UE 115-*b* may use different COT sharing parameter options from the COT sharing configuration 210. Additionally, UE 115-*a* may indicate an ED threshold used to initially acquire the COT to UE 115-*b* in SCI. Subsequently, based on the distance 225 and the ED threshold used by UE 115-*a*, UE 115-*b* may decide on corresponding COT sharing parameters. For example, if the distance 225 is below (such as, satisfies) a first threshold distance value (such as, distance 0), UE 115-*b* may determine to use the COT acquired by UE 115-*a* (such as, share the COT) for transmitting data to UE 115-*a* (such as, or any signaling targeting to UE 115-*a*) and other nodes (such as, additional UEs 115, one or more base stations 105, etc.) if UE 115-*a* uses an ED value below a first ED threshold (such as, ED threshold 0). For this first distance threshold value and the first ED threshold, UE 115-*b* may target any type of transmission to UE 115-*a* or may unicast a transmission to other nodes.

Additionally, or alternatively, if the distance 225 is below (such as, satisfies) a second threshold distance value (such as, distance 1) greater than the first threshold value, UE 115-*b* may determine to use the COT acquired by UE 115-*a* for up to M μs for transmitting data to UE 115-*a* if UE 115-*a* uses an ED value at least below a second ED threshold (such as, ED threshold 1), where the data transmissions can be sent to UE 115-*a* but not to other nodes. For example, for the second distance threshold value and the second ED threshold, the types of transmission that UE 115-*b* can transmit during the COT may include a unicast/broadcast/groupcast signal to UE 115-*a* but may not include unicast transmissions to other nodes.

If the distance 225 is below (such as, satisfies) a third threshold distance value (such as, distance 2) greater than the first and second threshold values, UE 115-*b* may determine to use the COT acquired by UE 115-*a* for up to N μs for transmitting data to UE 115-*a* if UE 115-*a* uses an ED value at least below a third ED threshold (such as, ED threshold 2). If the distance 225 is below (such as, satisfies) a fourth threshold distance value (such as, distance 3) greater than the first, second, and third threshold values, UE 115-*b* may determine to use the COT acquired by UE 115-*a* for up to K μs for transmitting control channel transmissions to UE 115-*a* if UE 115-*a* uses an ED value at least below a fourth ED threshold (such as, ED threshold 3). If the distance 225 is below (such as, satisfies) a fifth threshold distance value (such as, distance 4) greater than the first, second, third, and fourth threshold values and if UE 115-*a* uses an ED value that satisfies a fifth ED threshold value (such as, ED threshold 4), UE 115-*b* may determine to not use the COT acquired by UE 115-*a* for transmitting signaling to any node.

In some implementations, K μs may be less than N μs, and N μs may be less than M μs. For example, the amount of time UE 115-*b* can use the COT based on the fourth threshold distance value and the fourth ED threshold (K μs) may be less than the amount of time UE 115-*b* can use the COT based on the third threshold distance value and the third ED threshold (N μs), and amount of time UE 115-*b* can use the COT based on the third threshold distance value and the third ED threshold (N μs) may be less than amount of time UE 115-*b* can use the COT based on the second threshold distance value and the second ED threshold (M μs). That is, the farther apart that UE 115-*a* and UE 115-*b* are may indicate shorter durations that UE 115-*b* can use the COT (such as, share the COT). Additionally, the farther apart that UE 115-*a* and UE 115-*b* are also may indicate a smaller diversity of types of transmissions that UE 115-*b* can transmit when using the COT. For example, if UE 115-*a* and UE 115-*b* are closer together, UE 115-*b* may transmit a higher amount of transmissions (such as, unicast, broadcast, multicast, groupcast, data transmissions, control channel transmissions, signaling, etc.) to UE 115-*a* and to other nodes (such as, additional UEs 115, one or more base stations 105, etc.). As indicated above, the different COT sharing parameters (such as, durations of sharing the COT, types of transmission that can be sent, etc.) also may depend on the ED threshold value (or additional indicators) used by UE 115-*a* when initially acquiring the COT.

In some implementations (for example, for non-V2X sidelink communications), the distance 225 or a location of UE 115-*a* (such as, transmitting device) may not be easily available to UE 115-*a* or UE 115-*b*. In this case, UE 115-*b* may use a pathloss or RSRP metric (or RSRP along with a reference signal power from UE 115-*a* when available) instead of the distance 225 for determining the COT sharing between nodes. When a transmitting node reference signal power is available (for example, reference signal power measurement provided by UE 115-*a*), UE 115-*b* may use an RSRP metric of signaling received from UE 115-*a* along with the transmitting node reference signal power for determining the COT sharing. That is, UE 115-*b* may use a path loss-based COT sharing. For the same RSRP metric, when the transmitting node (for example, UE 115-*a*) has a lower reference signal power (that is, a smaller pathloss), UE 115-*b* may determine more aggressive COT sharing parameters (for example, longer durations that the COT can be used, greater amount of types of transmissions to send when using the COT, etc.) compared to scenarios when the transmitting node has higher reference signal power (that is, a larger pathloss). When a transmitting node reference signal power is not available, UE 115-*b* may use the RSRP metric (for example, a power measurement of signals transmitted from UE 115-*a* to UE 115-*b*). Subsequently, UE 115-*b*, based on a measured pathloss, RSRP, or both relative to the transmitting node, may apply corresponding COT sharing parameters accordingly. In some implementations, the measured pathloss, RSRP, or both may indicate an approximate distance between UE 115-*a* and UE 115-*b* (for example, a lower pathloss or higher RSRP may correspond to a closer approximate distance between the UEs 115, and a higher pathloss or lower RSRP may correspond to a farther approximate distance between the UEs 115).

Base station 105-*a* may configure the COT sharing configuration 210 (and corresponding COT sharing parameters) semi-statically (for example, via RRC signaling). That is, base station 105-*a* may determine the COT sharing configuration 210 including the distance/RSRP/ED thresholds for different sharing criteria and may signal the COT sharing configuration 210 with the different COT sharing parameters to UE 115-*a*, UE 115-*b*, or both semi-statically. For example, base station 105-*a* may transmit the COT sharing configuration 210 to UE 115-*a* over a link 215. In some implementations, base station 105-*a* also may transmit the COT sharing configuration 210 to UE 115-*b* over a link 220. Additionally, UE 115-*a* may indicate one or more of the COT sharing parameters to UE 115-*b* via dynamic signaling in SCI via sidelink 205. For example, UE 115-*a* may indicate the ED threshold used by UE 115-*a* for initially acquiring the COT in the SCI (for example, dynamic signaling) via sidelink 205.

In some implementations, UE 115-*a* (for example, transmitting node) also may schedule each receiving node (for example, including UE 115-*b*) on a sharing duration that each receiving node can use the COT (that is, share the COT once UE 115-*a* is finished using the COT). Additionally, COT sharing parameters may differ for different pairs of nodes. When a node shares its COT with multiple nodes, the node may use a lowest ED threshold among all the multiple nodes (for example, target nodes).

As described above, there may be two resource allocation modes for sidelink communications (such as, over a PC5 interface). In a first mode, base station 105-*a* may allocate resources for sidelink communications between UEs 115 (for example, between UE 115-*a* and UE 115-*b*). This concept may be applied to UE-to-UE COT sharing parameters. That is, base station 105-*a* may determine whether UE 115-*a* can share a COT with UE 115-*b*, a corresponding ED threshold for determining/indicating COT sharing parameters, allowed sharing durations, and types of transmissions that can be sent during the shared portion of the COT (such as, target transmissions for UE 115-*b* to share with UE 115-*a*).

Additionally, the first mode-based COT sharing design may be extended to relay operations. For example, for an L3 relay (that is, a relay configuration where a remote UE 115 is unknown to a base station 105 at a control plane level), the COT sharing design may be similar to a Uu interface design where a relay device (such as, relay UE 115) can make the determination for the COT sharing between itself and a remote device (such as, remote UE 115). For an L2 relay (that is, a relay configuration where a remote UE 115 is known to a base station 105 at a control plane level), base station 105-*a* may configure the COT sharing parameter for both the individual relay device and the remote device.

In a second mode for the resource allocation for sidelink communications, the UEs 115 may autonomously select sidelink resources. Accordingly, in the second mode, base station 105-*a* may not have control of the sidelink communications between UE 115-*a* and UE 115-*b*. Subsequently, UE 115-*a* (for example, the transmitting UE 115) may decide on the COT sharing parameters for UE 115-*b* (for example, the receiving UE 115) or based on a database profile for COT sharing, information for UE 115-*b*, or both.

Figure 3:
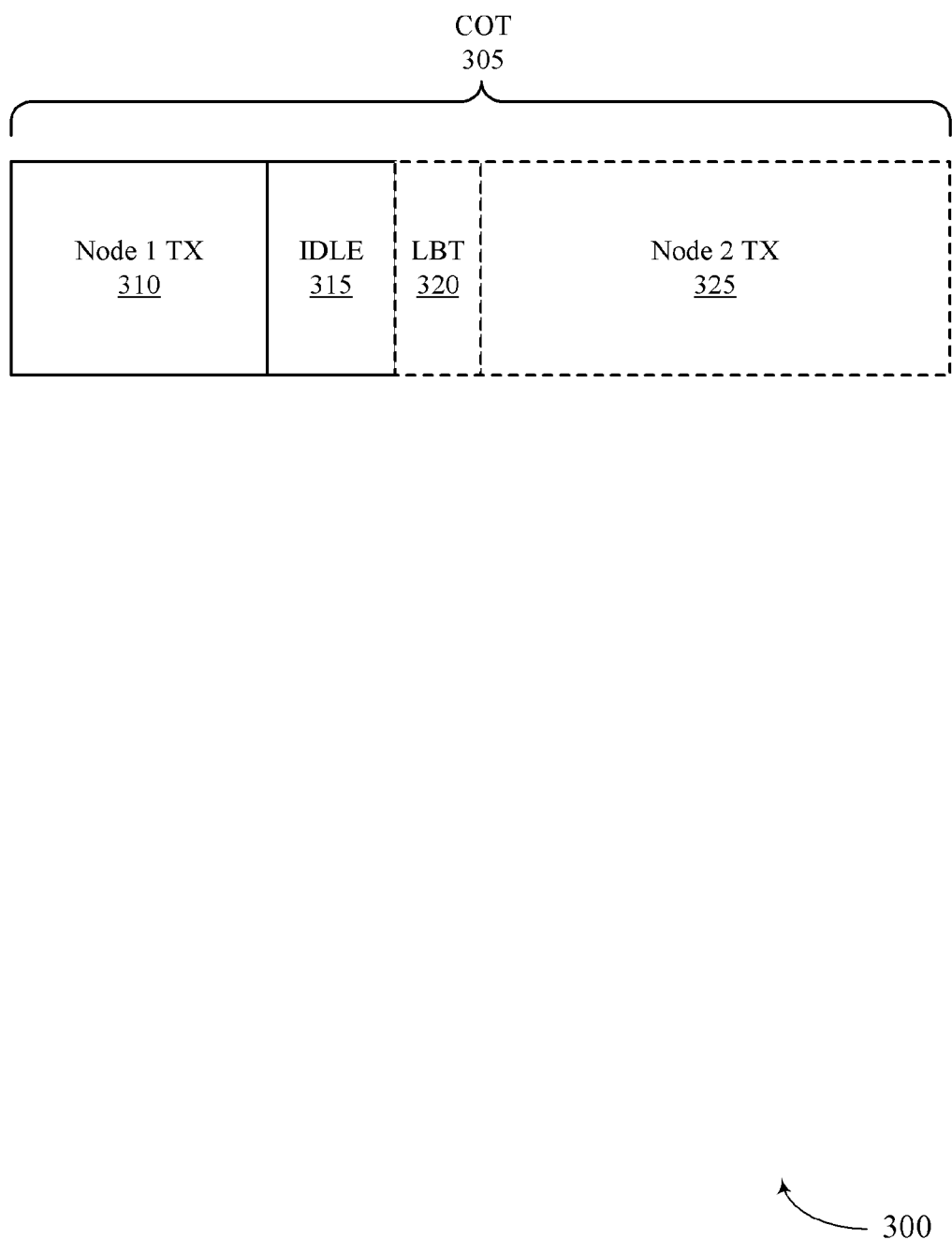
FIG. 3 illustrates an example of a COT sharing configuration that supports distance-based COT sharing.

FIG. 3 illustrates an example of a COT sharing configuration 300 that supports distance-based COT sharing. In some examples, COT sharing configuration 300 may implement aspects of wireless communications systems 100 or 200. For example, two UEs 115 may use COT sharing configuration 300 to share a COT acquired by one of the UEs 115.

The COT sharing configuration 300 may include a COT 305. The COT 305 may be acquired by a first wireless device, such as a UE 115, a base station 105, an access point, or a relay node. For example, the first wireless device may perform a CCA, such as an LBT procedure, to determine whether a channel (or one or more frequency bands) is available for communication in an unlicensed frequency band. During the CCA, the first wireless device may "listen" to the channel for signaling. If signaling is detected and a signal power of the signaling exceeds an ED threshold value, the first wireless device may determine that the channel is occupied and may try a different channel or try the same channel after a time duration. Alternatively, if no signaling is detected or signaling is detected and the signal power of the signaling is below the ED threshold value, the first wireless device may determine that the channel is not occupied and may use the channel for a configured duration. Accordingly, this configured duration may be the COT 305.

However, the first wireless device may not need the entirety of the COT 305 for its transmissions. For example, the first wireless device may use the COT 305 for a first transmission opportunity 310. Rather than leaving the rest of the COT 305 unused, the first wireless device may share the rest of the COT 305 with one or more additional devices, nodes, etc. according to the techniques described herein. That is, the first wireless device may use a distance-based COT sharing configuration between multiple nodes. In some implementations, the first wireless device may be a first UE 115 (for example, a first device, a transmitting device, etc.), and the first wireless device may share the COT 305 with a second UE 115 (for example, a second device, a receiving device, etc.) over a sidelink. Based on a distance between the first UE 115 and the second UE 115 (for example, a transmitter-receiver distance), the second UE 115 may decide on corresponding COT sharing parameters. In some implementations, the second UE 115 may determine the distance based on location information (for example, a zone ID for the first UE 115 indicated in SCI) or approximated by a power metric (for example, RSRP, pathloss, etc.) between multiple nodes.

Subsequently, once the first UE 115 finished the transmission during the first transmission opportunity 310, the second UE 115 may have access to use (for example, share) the COT 305. In some implementations, the first UE 115 may first enter an idle state 315, and the wireless resources on the sidelink may not be used. Prior to gaining access to the COT acquired by the first UE 115, the second UE 115 may perform an LBT 320 to determine whether the second UE 115 can transmit during a second transmission opportunity 325. In some implementations, the second UE 115 may share the COT 305 with the first UE 115 based on using a Category 2 LBT for the LBT 320. For LBE, the second UE 115 may avoid a Category 4 LBT. Additionally, or alternatively, for FBE, the second UE 115 may use the COT 305 without accessing the medium in the beginning of each FFP.

As described herein, the first UE 115 and the second UE 115 may use the distance-based COT sharing between nodes, where depending on a distance between the first UE 115 and the second UE 115 or an RSRP measurement from the first UE 115, the second UE 115, or both, the second UE 115 may or may not share the COT 305 with the first UE 115. For example, if the distance between the first UE 115 and the second UE 115 is less than a threshold distance value and the first UE 115 used an ED value for initially acquiring the COT 305 that is below an ED threshold value, the second UE 115 may use the second transmission opportunity 325 for transmitting one or more signals to the first UE 115, additional devices, or both.

Figure 4:
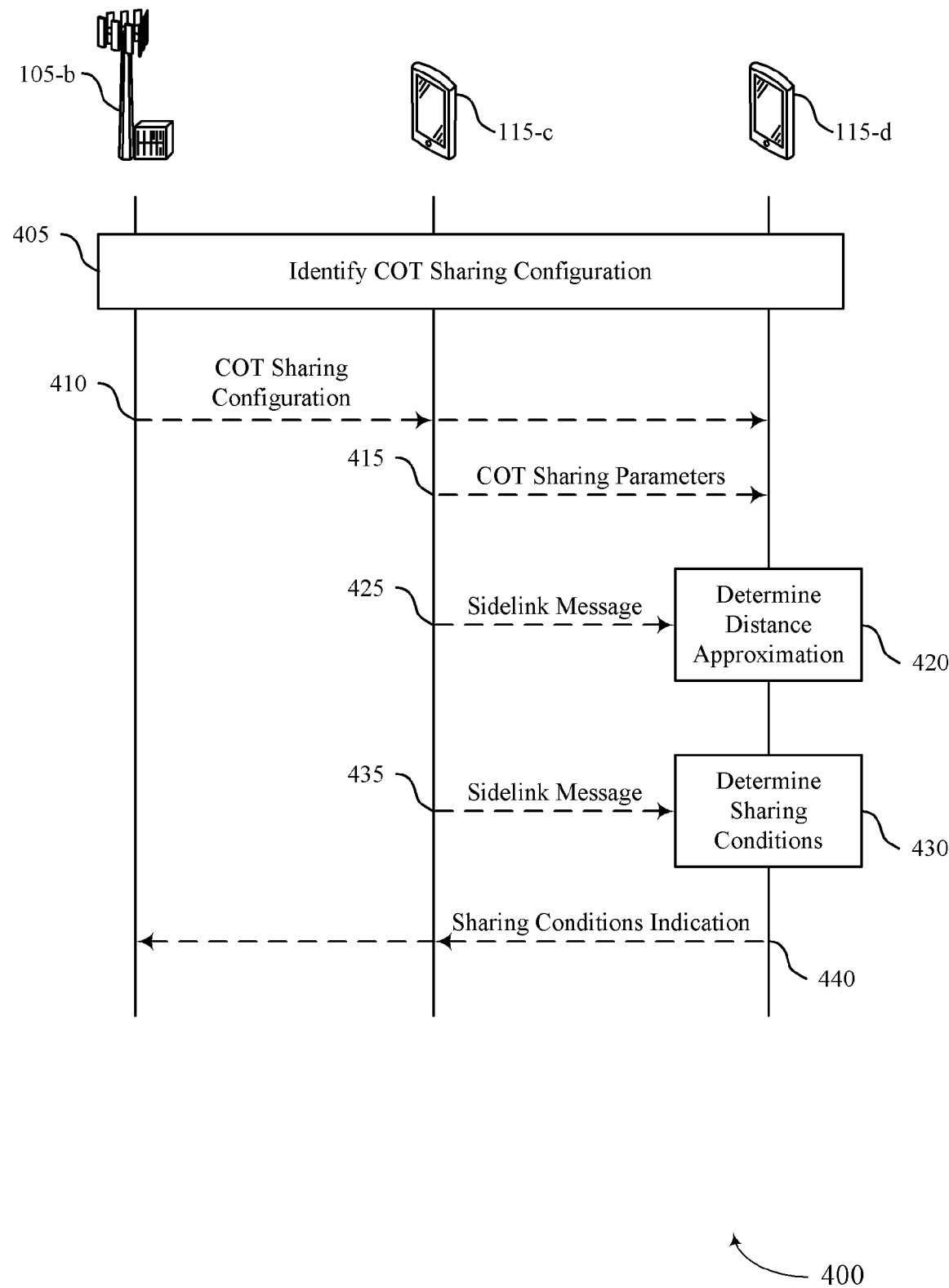
FIG. 4 illustrates an example of a process flow diagram that supports distance-based COT sharing.

FIG. 4 illustrates an example of a process flow 400 that supports distance-based COT sharing. In some examples, process flow 400 may implement aspects of wireless communication systems 100 or 200. The process flow 400 may include base station 105-b, UE 115-c (for example, a second device, a transmitting device, etc.), and UE 115-d (for example, a first device, a receiving device, etc.), which may be examples of corresponding devices as described herein. While UE 115-c and UE 115-d are shown performing the techniques for the distance-based COT sharing, the techniques may be performed by additional wireless devices, access points, base stations, or a combination thereof.

In the following description of the process flow 400, the operations between base station 105-b, UE 115-c, and UE 115-d may be performed in a different order than the example order shown, or the operations performed by base station 105-b, UE 115-c, and UE 115-d may be performed in different orders or at different times. Some operations also may be omitted from the process flow 400, and other operations may be added to the process flow 400. The operations performed by base station base station 105-b, UE 115-c, and UE 115-d may support improvement to COT sharing for the UEs 115 and, in some examples, may promote improvements to COT sharing for the UEs 115, among other benefits.

At 405, base station 105-b, UE 115-c, UE 115-d, or a combination thereof may identify a COT sharing configuration that includes a set of COT sharing parameters for sharing a COT of a communications link between UE 115-c and UE 115-d based in part on a distance, such as an approximate distance, between UE 115-c and UE 115-d. In some implementations, the set of COT sharing parameters may include a sharing duration, one or more distance thresholds, an ED threshold, a type of transmission for UE 115-d to use during the COT, an RSRP threshold value, or a combination thereof. Additionally, the communication link may include a PC5 interface link, a sidelink, or a combination thereof.

At 410, UE 115-d may receive the COT sharing configuration via semi-static signaling (for example, from base station 105-b).

At 415, UE 115-d may receive from UE 115-c, one or more COT sharing parameters via dynamic signaling. In some implementations, the dynamic signaling may include a control information message (for example, an SCI message). Additionally, the one or more COT sharing parameters may include an ED threshold (for example, used by UE 115-c to acquire the COT), a sharing duration, or a combination thereof. In some implementations, the one or more COT sharing parameters may be based on a database profile for the sharing of the COT.

At 420, UE 115-d may determine an approximation of the distance between UE 115-c and UE 115-d. For example, UE 115-d may determine the approximation of the distance between UE 115-c and UE 115-d satisfies a communication range threshold value (for example, a distance threshold value), where the COT is shared with UE 115-c based in part on the approximation of the distance satisfying the communication range threshold value. In some implementations, the approximation of the distance between UE 115-c and UE 115-d may be less than or equal to the communication range threshold value. Additionally, the communication range threshold value may be configured for the sharing of the COT.

At 425, in some implementations, UE 115-d may receive, from UE 115-c, a control information message (for example, an SCI message, a sidelink message, etc.), may decode the control information message, and may determine the communication range threshold value based on the decoded control information message.

Additionally, or alternatively, UE 115-d may receive, from UE 115-c, a control information message (for example, an SCI message, a sidelink message, etc.), where the control information message includes a zone ID associated with UE 115-c, and may estimate the distance between UE 115-c and UE 115-d based on the control information message and a location of UE 115-d.

At 430, UE 115-d may determine sharing conditions for sharing the COT based the COT sharing configuration and the approximation of the distance between UE 115-c and UE 115-d. In some implementations, UE 115-c, base station 105-b, or both also may determine the sharing conditions and indicate the sharing conditions to UE 115-d. In some implementations, UE 115-d may determine a transmission type that can be shared within the COT, a duration for the sharing of the COT, or both corresponding to the approximation of the distance and an ED threshold used by UE 115-d. Additionally, UE 115-d may share the COT with multiple devices, the multiple devices including at least UE 115-c. In some implementations, the COT sharing configuration may be designed for a relay operation.

At 435, UE 115-d may receive, from UE 115-c, an indication of the ED threshold used by UE 115-c. In some implementations, UE 115-d may determine to not share the COT with UE 115-d based on the approximation of the distance exceeding a threshold value and the ED threshold exceeding an ED threshold value.

In some implementations, rather than using the approximation of the distance, UE 115-d may receive, from UE 115-c, a message and may determine a power metric for the received message, where the sharing conditions are determined based on the determined power metric. For example, the power metric may include a pathloss measurement, an RSRP measurement, a reference signal power for the message, or a combination thereof.

At 440, UE 115-d may transmit an indication of the sharing conditions, where the indication includes a message of one or more COT sharing parameters of the set of COT sharing parameters for the sharing of the COT. In some implementations, UE 115-d may transmit the indication of the sharing conditions to UE 115-c, base station 105-b, or both. For example, UE 115-c may determine, from the indication of the sharing conditions, one or more COT sharing parameters to enable UE 115-*d* to use the COT after UE 115-*c* is finished using the COT. In some implementations, the one or more COT sharing parameters may include a starting time for UE 115-*d* to begin using the COT, a type of transmission UE 115-*d* is permitted to transmit in the COT, or a combination thereof.

Figure 5:
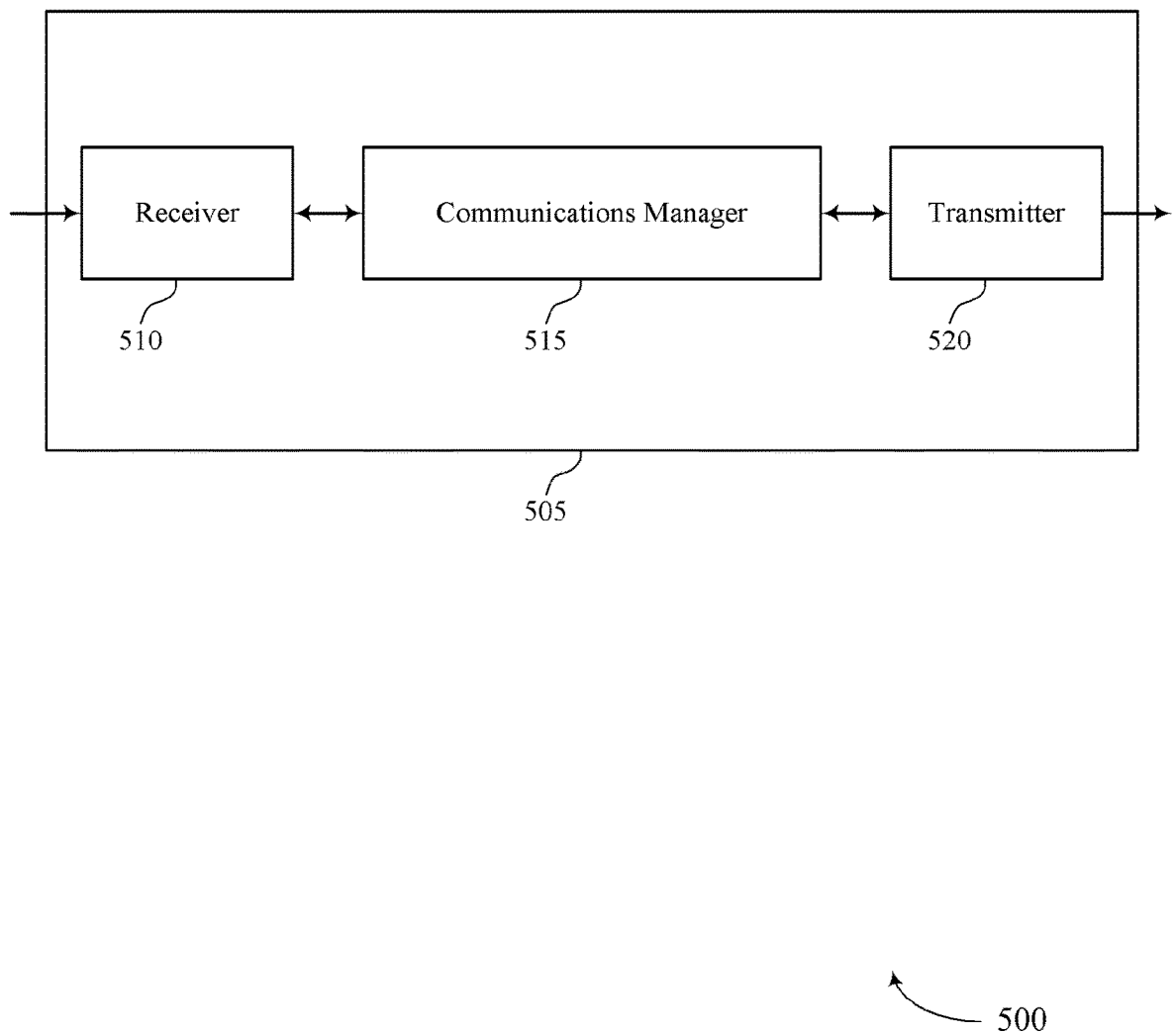
FIGS. 5 and 6 show block diagrams of example devices that support distance-based COT sharing.

FIG. 5 shows a block diagram 500 of an example device 505 that supports distance-based COT sharing. The device 505 may be an example of aspects of a UE 115 as described herein. The device 505 may include a receiver 510, a communications manager 515, and a transmitter 520. The device 505 also may include a processor. Each of these components may be in communication with one another (such as, via one or more buses).

The receiver 510 may receive information such as packets, user data, or control information associated with various information channels (such as, control channels, data channels, and information related to distance-based COT sharing, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a COT sharing configuration including a set of COT sharing parameters for sharing a COT of a communications link with a second device based on a distance between the first device and the second device. Additionally, the communications manager 515 may determine an approximation of the distance between the first device and the second device. In some implementations, the communications manager 515 may determine sharing conditions for sharing the COT based on the COT sharing configuration and the approximation of the distance between the first device and the second device.

Additionally, or alternatively, the communications manager 515 may identify a COT sharing configuration including a set of COT sharing parameters for sharing a COT of a communications link with a first device based on a distance between the first device and the second device. In some implementations, the communications manager 515 may transmit, to the first device, the COT sharing configuration. Additionally, the communications manager 515 may receive, from the first device, an indication of sharing conditions for the sharing of the COT with the first device, the sharing conditions based on the COT sharing configuration and the distance between the first device and the second device. The communications manager 515 may be an example of aspects of the communications manager 810 described herein.

The communications manager 515, or its sub-components, may be implemented in hardware, code (such as, software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
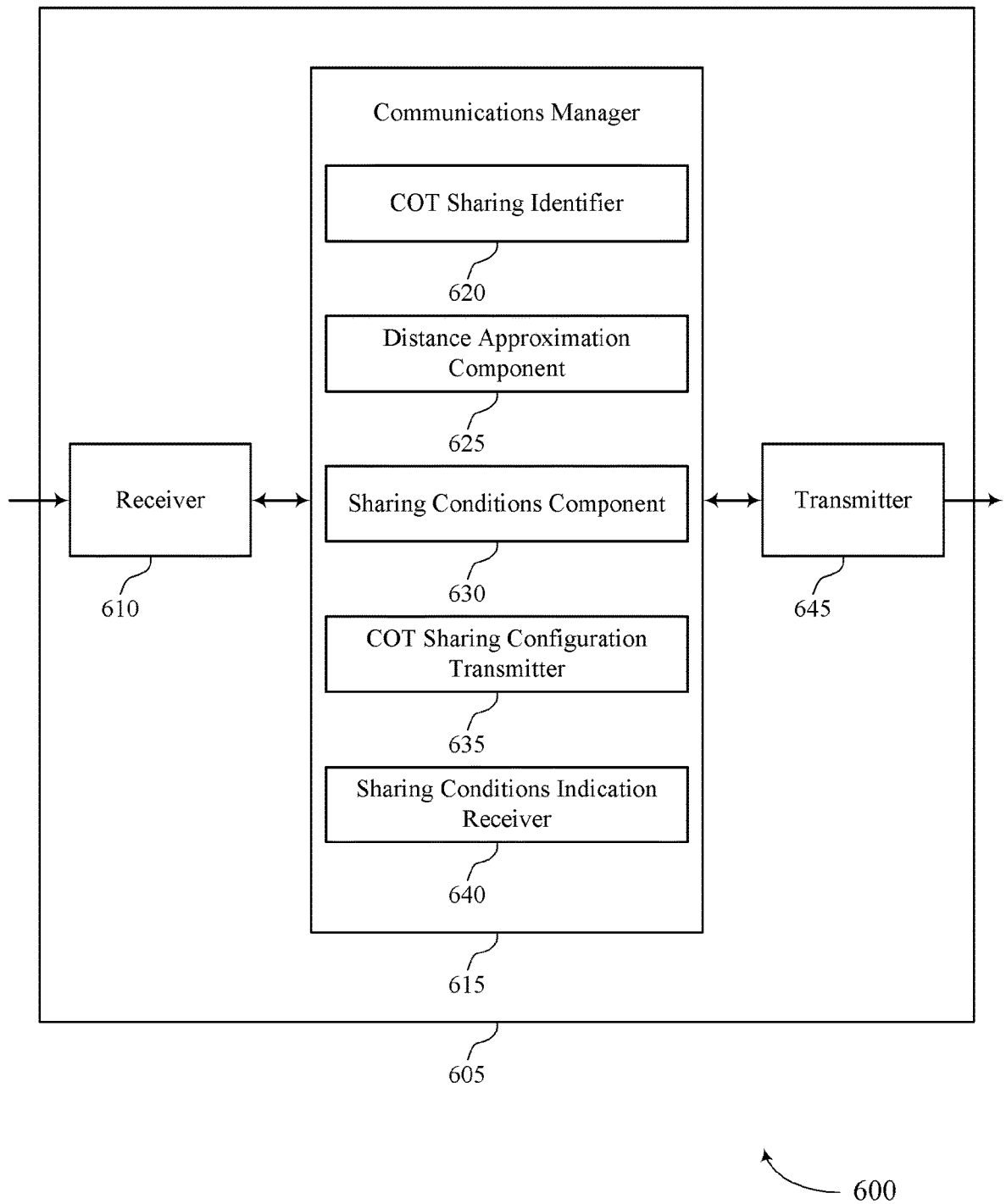

FIG. 6 shows a block diagram 600 of an example device 605 that supports distance-based COT sharing. The device 605 may be an example of aspects of a device 505, or a UE 115 as described herein. The device 605 may include a receiver 610, a communications manager 615, and a transmitter 645. The device 605 also may include a processor. Each of these components may be in communication with one another (such as, via one or more buses).

The receiver 610 may receive information such as packets, user data, or control information associated with various information channels (such as, control channels, data channels, and information related to distance-based COT sharing, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a COT sharing identifier 620, a distance approximation component 625, a sharing conditions component 630, a COT sharing configuration transmitter 635, and a sharing conditions indication receiver 640. The communications manager 615 may be an example of aspects of the communications manager 810 described herein.

The COT sharing identifier 620 may identify a COT sharing configuration including a set of COT sharing parameters for sharing a COT of a communications link with a second device based on a distance between the first device and the second device.

The distance approximation component 625 may determine an approximation of the distance between the first device and the second device.

The sharing conditions component 630 may determine sharing conditions for sharing the COT based on the COT sharing configuration and the approximation of the distance between the first device and the second device.

The COT sharing identifier 620 may identify a COT sharing configuration including a set of COT sharing parameters for sharing a COT of a communications link with a first device based on a distance between the first device and the second device.

The COT sharing configuration transmitter 635 may transmit, to the first device, the COT sharing configuration.

The sharing conditions indication receiver 640 may receive, from the first device, an indication of sharing conditions for the sharing of the COT with the first device, the sharing conditions based on the COT sharing configuration and the distance between the first device and the second device.

The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

Figure 7:
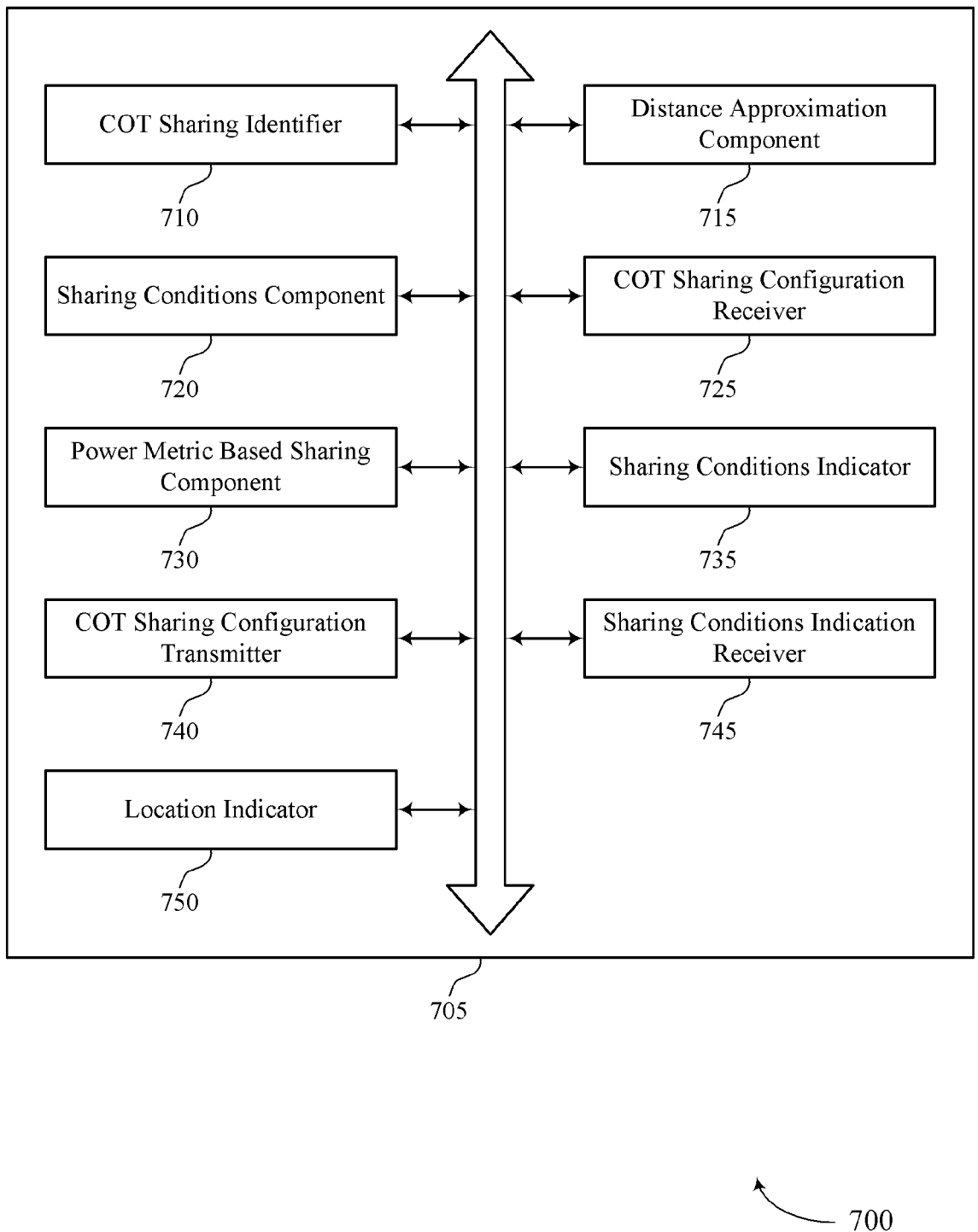
FIG. 7 shows a block diagram of an example communications manager that supports distance-based COT sharing.

FIG. 7 shows a block diagram 700 of an example communications manager 705 that supports distance-based COT sharing. The communications manager 705 may be an example of aspects of a communications manager 515, a communications manager 615, or a communications manager 810 described herein. The communications manager 705 may include a COT sharing identifier 710, a distance approximation component 715, a sharing conditions component 720, a COT sharing configuration receiver 725, a power metric based sharing component 730, a sharing conditions indicator 735, a COT sharing configuration transmitter 740, a sharing conditions indication receiver 745, and a location indicator 750. Each of these modules may communicate, directly or indirectly, with one another (such as, via one or more buses).

The COT sharing identifier 710 may identify a COT sharing configuration including a set of COT sharing parameters for sharing a COT of a communications link with a second device based on a distance between the first device and the second device.

In some examples, the COT sharing identifier 710 may identify a COT sharing configuration including a set of COT sharing parameters for sharing a COT of a communications link with a first device based on a distance between the first device and the second device. In some examples, the COT sharing identifier 710 may share the COT with a set of devices, the set of devices including at least the second device. In some implementations, the COT sharing configuration is designed for a relay operation.

In some implementations, the set of COT sharing parameters includes a sharing duration, one or more distance thresholds, an energy detection threshold, a type of transmission for the first device to use during the COT, a reference signal received power threshold value, or a combination thereof. In some implementations, the communication link includes a PC5 interface link, a sidelink, or a combination thereof. In some implementations, the first device and the second device include a UE, an access point, a base station, or a combination thereof.

The distance approximation component 715 may determine an approximation of the distance between the first device and the second device. In some examples, the distance approximation component 715 may determine the approximation of the distance between the first device and the second device satisfies a communication range threshold value, where the COT is shared with the second device based on the approximation of the distance satisfying the communication range threshold value. In some examples, the distance approximation component 715 may receive, from the second device, a control information message, may decode the control information message, and may determine the communication range threshold value based on the decoded control information message.

In some examples, the distance approximation component 715 may receive, from the second device, a control information message, where the control information message includes a zone identifier associated with the second device and may estimate the distance between the first device and the second device based on the control information message and a location of the first device. In some implementations, the approximation of the distance between the first device and the second device is less than or equal to the communication range threshold value. In some implementations, the communication range threshold value is configured for the sharing of the COT.

The sharing conditions component 720 may determine sharing conditions for sharing the COT based on the COT sharing configuration and the approximation of the distance between the first device and the second device. In some examples, the sharing conditions component 720 may determine a transmission type that can be shared within the COT, a duration for the sharing of the COT, or both corresponding to the approximation of the distance and an energy detection threshold used by the second device.

In some examples, the sharing conditions component 720 may receive, from the second device, an indication of the energy detection threshold used by the second device. In some examples, the sharing conditions component 720 may determine to not share the COT with the second device based on the approximation of the distance exceeding a threshold value and the energy detection threshold exceeding an energy detection threshold value.

The COT sharing configuration transmitter 740 may transmit, to the first device, the COT sharing configuration. In some examples, the COT sharing configuration transmitter 740 may transmit, to the first device, one or more COT sharing parameters via dynamic signaling. In some examples, the COT sharing configuration transmitter 740 may determine the one or more COT sharing parameters based on a database profile for the sharing of the COT. In some implementations, the dynamic signaling includes a control information message. In some implementations, the one or more COT sharing parameters include an energy detection threshold, a sharing duration, or a combination thereof.

The sharing conditions indication receiver 745 may receive, from the first device, an indication of sharing conditions for the sharing of the COT with the first device, the sharing conditions based on the COT sharing configuration and the distance between the first device and the second device. In some examples, the sharing conditions indication receiver 745 may determine, from the indication of the sharing conditions, one or more COT sharing parameters to enable the second device to use the COT after the first device is finished using the COT. In some implementations, the one or more COT sharing parameters include a starting time for the first device to begin using the COT, a type of transmission the first device is permitted to transmit in the COT, or a combination thereof.

The COT sharing configuration receiver 725 may receive the COT sharing configuration via semi-static signaling. In some implementations, the semi-static signaling includes control signaling from a base station.

In some examples, the COT sharing configuration receiver 725 may receive, from the second device, one or more COT sharing parameters via dynamic signaling. In some implementations, the dynamic signaling includes a control information message. In some implementations, the one or more COT sharing parameters include an energy detection threshold, a sharing duration, or a combination thereof. In some implementations, the one or more COT sharing parameters are based on a database profile for the sharing of the COT.

The power metric based sharing component 730 may receive, from the second device, a message. In some examples, the power metric based sharing component 730 may determine a power metric for the received message, where the sharing conditions are determined based on the determined power metric. In some implementations, the power metric includes a pathloss measurement, an RSRP measurement, a reference signal power for the message, or a combination thereof.

The sharing conditions indicator 735 may transmit an indication of the sharing conditions, where the indication includes a message of one or more COT sharing parameters of the set of COT sharing parameters for the sharing of the COT.

The location indicator 750 may transmit, to the first device, a control information message, where the control information message includes a zone identifier associated with the second device.

Figure 8:
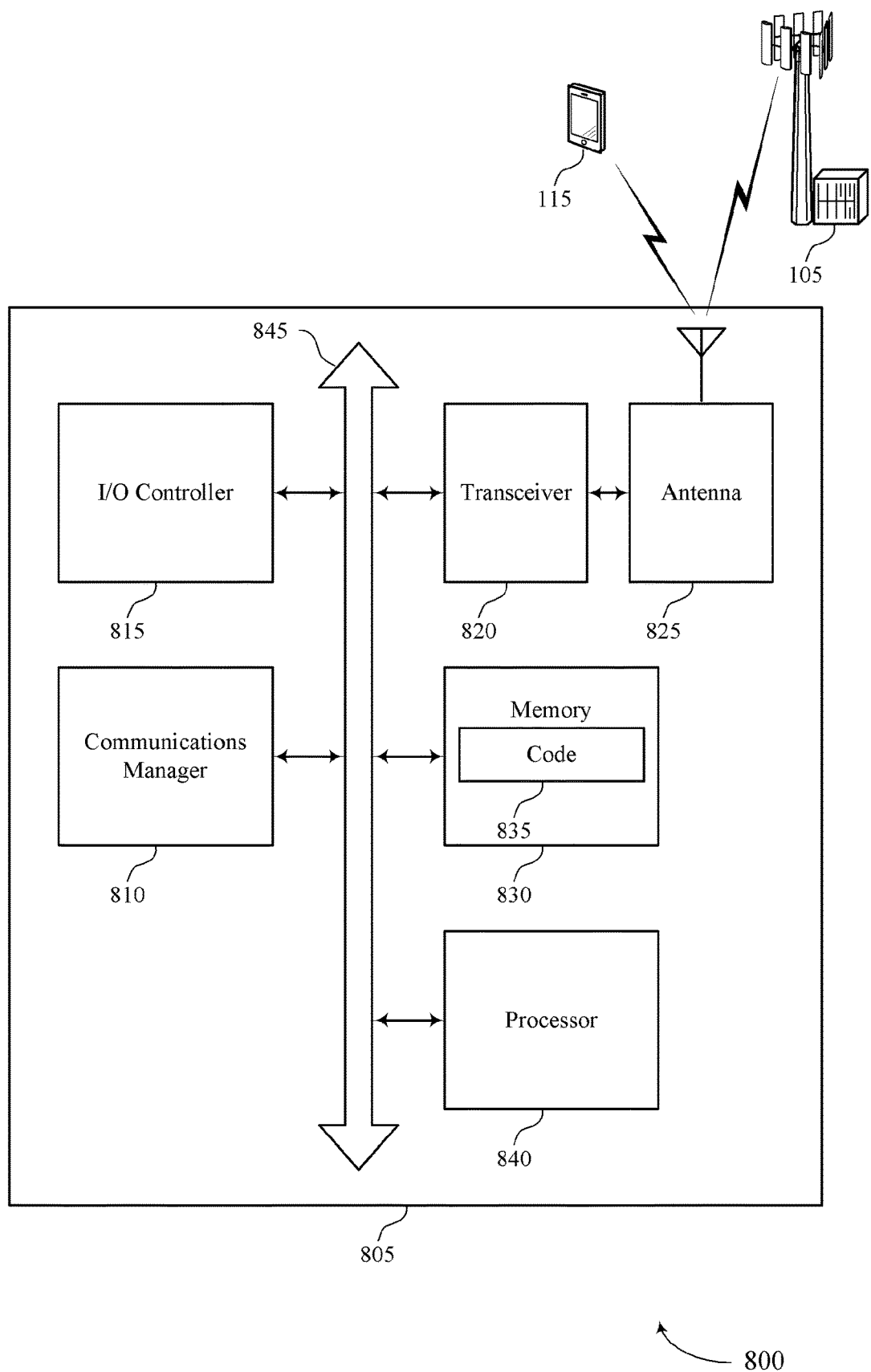
FIG. 8 shows a diagram of an example system that supports distance-based COT sharing.

FIG. 8 shows a diagram of an example system 800 including a device 805 that supports distance-based COT sharing. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (such as, bus 845).

The communications manager 810 may identify a COT sharing configuration including a set of COT sharing parameters for sharing a COT of a communications link with a second device based on a distance between the first device and the second device, determine an approximation of the distance between the first device and the second device, and determine sharing conditions for sharing the COT based on the COT sharing configuration and the approximation of the distance between the first device and the second device.

Additionally, or alternatively, the communications manager 810 also may identify a COT sharing configuration including a set of COT sharing parameters for sharing a COT of a communications link with a first device based on a distance between the first device and the second device, transmit, to the first device, the COT sharing configuration, and receive, from the first device, an indication of sharing conditions for the sharing of the COT with the first device, the sharing conditions based on the COT sharing configuration and the distance between the first device and the second device.

The I/O controller 815 may manage input and output signals for the device 805. The I/O controller 815 also may manage peripherals not integrated into the device 805. In some implementations, the I/O controller 815 may represent a physical connection or port to an external peripheral. In some implementations, the I/O controller 815 may utilize an operating system such as iOS®, ANDROID®, MS-DOS®, MS-WINDOWS®, OS/2®, UNIX®, LINUX®, or another known operating system. In other examples, the I/O controller 815 may represent or interact with a modem, a keyboard, a mouse, a touchscreen, or a similar device. In some implementations, the I/O controller 815 may be implemented as part of a processor. In some implementations, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 also may include a modem to modulate the packets and provide the modulated packets to the antennas for transmission, and to demodulate packets received from the antennas.

In some implementations, the wireless device may include a single antenna 825. However, in some implementations the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some implementations, the memory 830 may contain, among other things, a basic I/O system (BIOS) which may control basic hardware or software operation such as the interaction with peripheral components or devices.

The processor 840 may include an intelligent hardware device, (such as, a general-purpose processor, a DSP, a central processing unit (CPU), a microcontroller, an ASIC, an FPGA, a programmable logic device, a discrete gate or transistor logic component, a discrete hardware component, or any combination thereof). In some implementations, the processor 840 may be configured to operate a memory array using a memory controller. In other implementations, a memory controller may be integrated into the processor 840. The processor 840 may be configured to execute computer-readable instructions stored in a memory (such as, the memory 830) to cause the device 805 to perform various functions (such as, functions or tasks supporting distance-based COT sharing).

In some implementations, the processor 840 may be a component of a processing system. A processing system may generally refer to a system or series of machines or components that receives inputs and processes the inputs to produce a set of outputs (which may be passed to other systems or components of, for example, the device 805, such as a UE 115, a base station 105, an access point, a station, or different device). For example, a processing system of the device 805 may refer to a system including the various other components or subcomponents of the device 805.

The processing system of the device 805 may interface with other components of the device 805, and may process information received from other components (such as inputs or signals), output information to other components, etc. For example, a chip or modem of the device 805 may include a processing system, a first interface to output information, and a second interface to receive information. In some implementations, the first interface may refer to an interface between the processing system of the chip or modem and a transmitter, such that the device 805 may transmit information output from the chip or modem. In some implementations, the second interface may refer to an interface between the processing system of the chip or modem and a receiver, such that the device 805 may receive information or signal inputs, and the information may be passed to the processing system. A person having ordinary skill in the art will readily recognize that the first interface also may receive information or signal inputs, and the second interface also may transmit information.

The code 835 may include instructions to implement aspects of the present disclosure, including instructions to support wireless communications. The code 835 may be stored in a non-transitory computer-readable medium such as system memory or other type of memory. In some implementations, the code 835 may not be directly executable by the processor 840 but may cause a computer (such as, when compiled and executed) to perform functions described herein.

Figure 9:
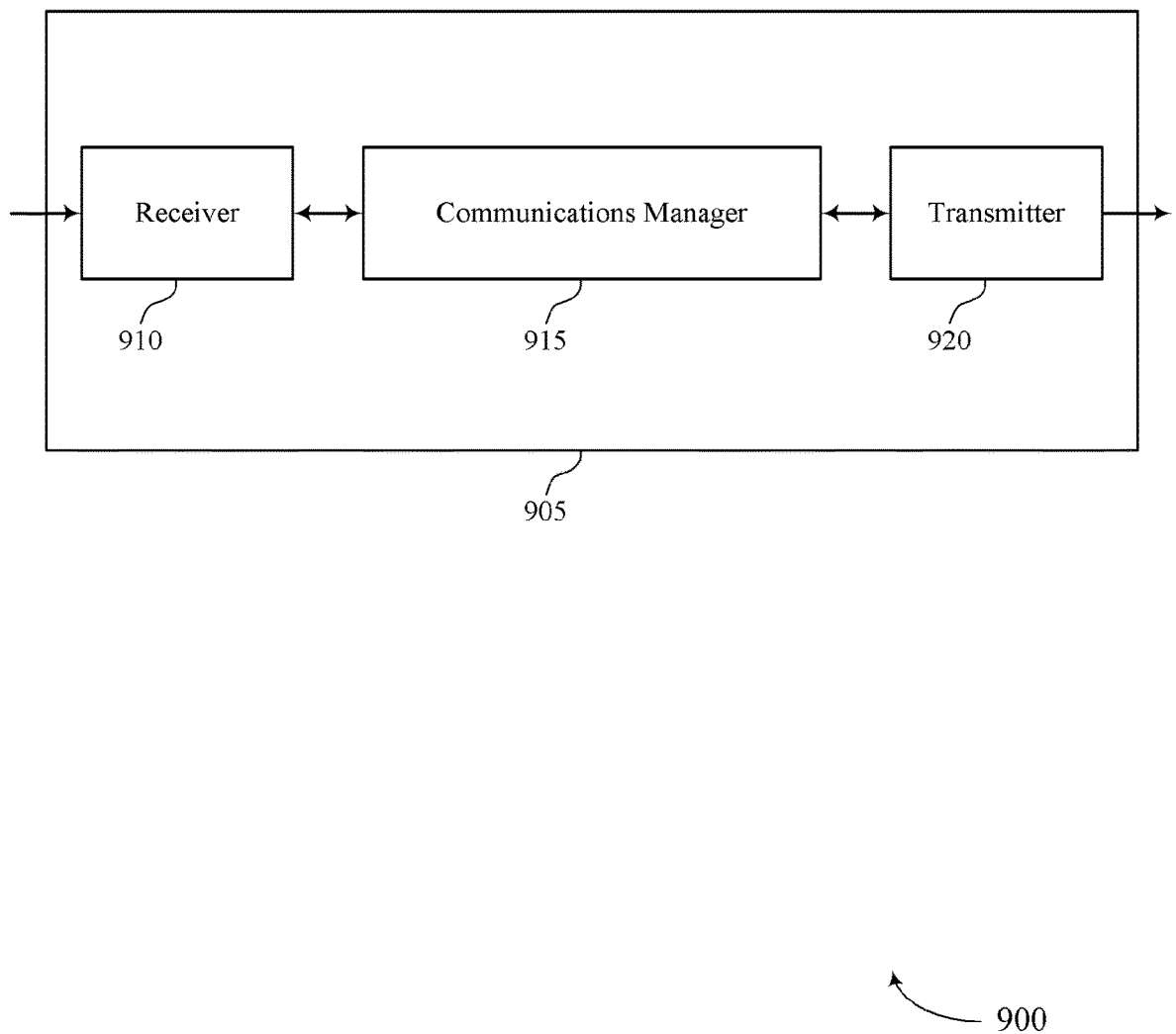
FIGS. 9 and 10 show block diagrams of example devices that support distance-based COT sharing.

FIG. 9 shows a block diagram 900 of an example device 905 that supports distance-based COT sharing. The device 905 may be an example of aspects of a base station 105 as described herein. The device 905 may include a receiver 910, a communications manager 915, and a transmitter 920. The device 905 also may include a processor. Each of these components may be in communication with one another (such as, via one or more buses).

The receiver 910 may receive information such as packets, user data, or control information associated with various information channels (such as, control channels, data channels, and information related to distance-based COT sharing, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a COT sharing configuration including a set of COT sharing parameters for sharing a COT of a communications link between a first device and a second device based on a distance between the first device and the second device. Additionally, the communications manager 915 may transmit an indication of the COT sharing configuration, the indication includes a downlink message of one or more COT sharing parameters of the set of COT sharing parameters for the sharing of the COT. The communications manager 915 may be an example of aspects of the communications manager 1210 described herein.

The communications manager 915, or its sub-components, may be implemented in hardware, code (such as, software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
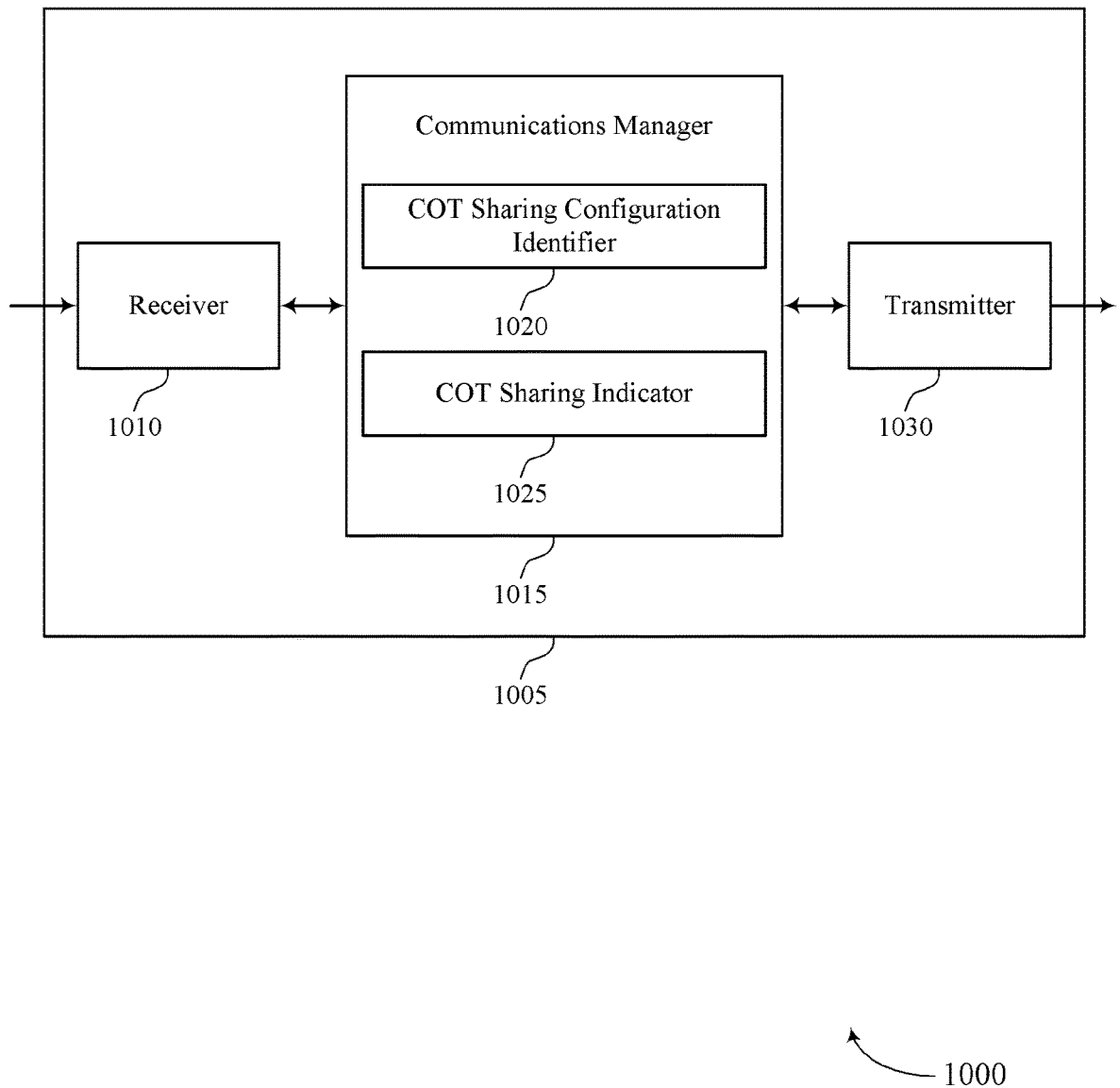

FIG. 10 shows a block diagram 1000 of an example device 1005 that supports distance-based COT sharing. The device 1005 may be an example of aspects of a device 905, or a base station 105 as described herein. The device 1005 may include a receiver 1010, a communications manager 1015, and a transmitter 1030. The device 1005 also may include a processor. Each of these components may be in communication with one another (such as, via one or more buses).

The receiver 1010 may receive information such as packets, user data, or control information associated with various information channels (such as, control channels, data channels, and information related to distance-based COT sharing, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a COT sharing configuration identifier 1020 and a COT sharing indicator 1025. The communications manager 1015 may be an example of aspects of the communications manager 1210 described herein.

The COT sharing configuration identifier 1020 may identify a COT sharing configuration including a set of COT sharing parameters for sharing a COT of a communications link between a first device and a second device based on a distance between the first device and the second device.

The COT sharing indicator 1025 may transmit an indication of the COT sharing configuration, the indication includes a downlink message of one or more COT sharing parameters of the set of COT sharing parameters for the sharing of the COT.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
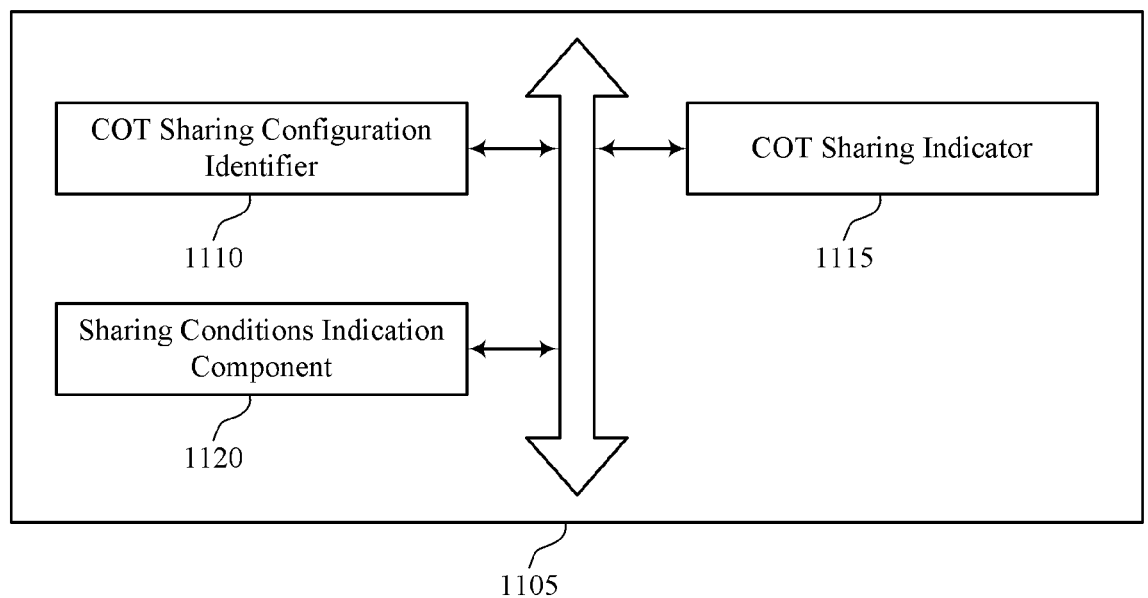
FIG. 11 shows a block diagram of an example communications manager that supports distance-based COT sharing.

FIG. 11 shows a block diagram 1100 of an example communications manager 1105 that supports distance-based COT sharing. The communications manager 1105 may be an example of aspects of a communications manager 915, a communications manager 1015, or a communications manager 1210 described herein. The communications manager 1105 may include a COT sharing configuration identifier 1110, a COT sharing indicator 1115, and a sharing conditions indication component 1120. Each of these modules may communicate, directly or indirectly, with one another (such as, via one or more buses).

The COT sharing configuration identifier 1110 may identify a COT sharing configuration including a set of COT sharing parameters for sharing a COT of a communications link between a first device and a second device based on a distance between the first device and the second device. In some implementations, the COT sharing configuration is designed for a relay operation. In some implementations, the set of COT sharing parameters includes a sharing duration, one or more distance thresholds, an energy detection threshold, a type of transmission for the first device to use during the COT, a reference signal received power threshold value, or a combination thereof. In some implementations, the communication link includes a PC5 interface link, a sidelink, or a combination thereof. In some implementations, the first device and the second device include a UE, an access point, a base station, or a combination thereof.

The COT sharing indicator 1115 may transmit an indication of the COT sharing configuration, the indication includes a downlink message of one or more COT sharing parameters of the set of COT sharing parameters for the sharing of the COT. In some examples, the COT sharing indicator 1115 may transmit, to the first device, the second device, or both, the COT sharing configuration via semi-static signaling.

The sharing conditions indication component 1120 may receive, from the first device, an indication of sharing conditions for the sharing of the COT between the first device and the second device, the sharing conditions based on the distance between the first device and the second device.

Figure 12:
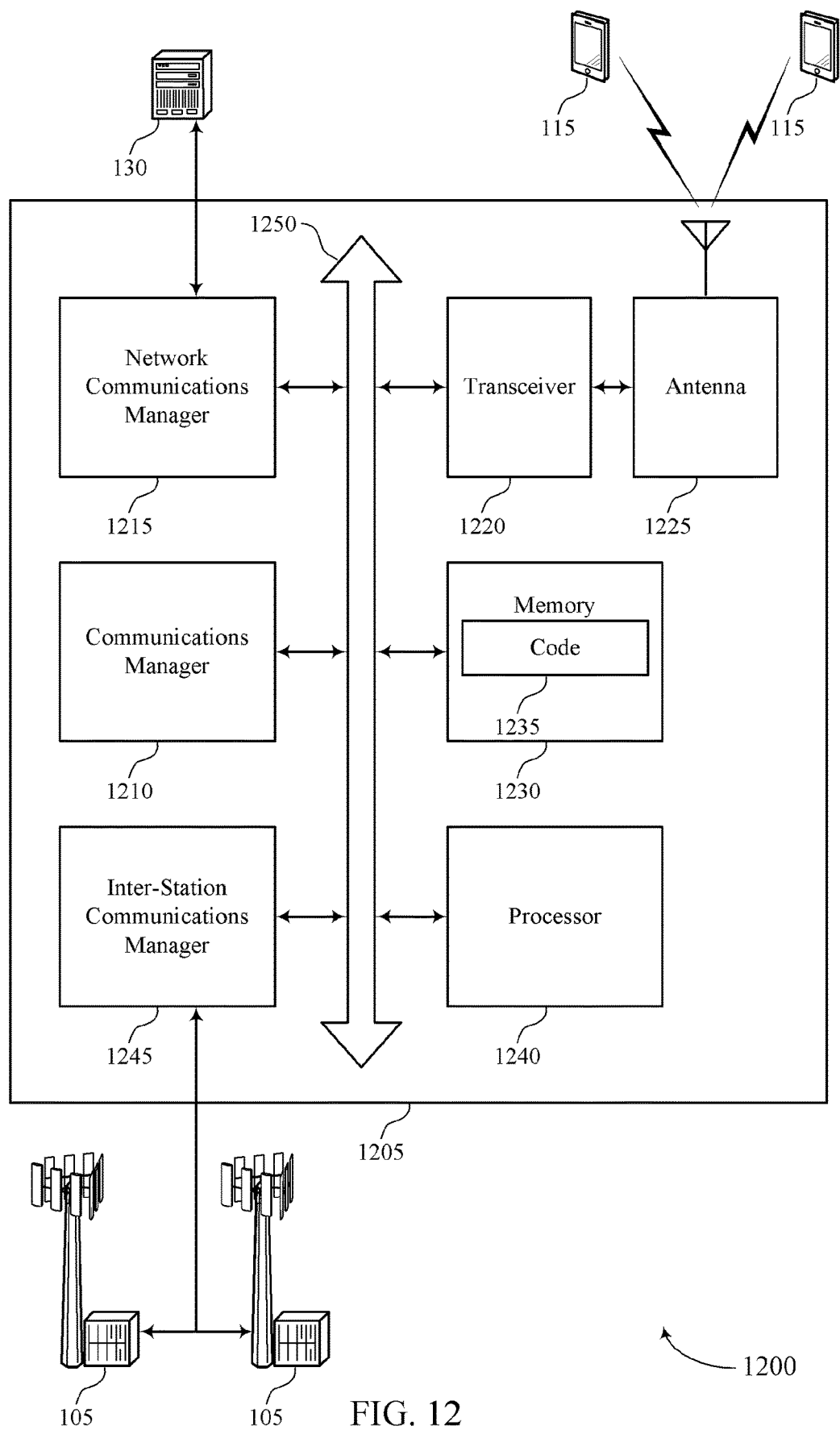
FIG. 12 shows a diagram of an example system that supports distance-based COT sharing.

FIG. 12 shows a diagram of an example system 1200 including a device 1205 that supports distance-based COT sharing. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (such as, bus 1250).

The communications manager 1210 may identify a COT sharing configuration including a set of COT sharing parameters for sharing a COT of a communications link between a first device and a second device based on a distance between the first device and the second device and transmit an indication of the COT sharing configuration, the indication includes a downlink message of one or more COT sharing parameters of the set of COT sharing parameters for the sharing of the COT.

The network communications manager 1215 may manage communications with the core network (such as, via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 also may include a modem to modulate the packets and provide the modulated packets to the antennas for transmission, and to demodulate packets received from the antennas.

In some implementations, the wireless device may include a single antenna 1225. However, in some implementations the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (such as, the processor 1240) cause the device to perform various functions described herein. In some implementations, the memory 1230 may contain, among other things, a BIOS which may control basic hardware or software operation such as the interaction with peripheral components or devices.

The processor 1240 may include an intelligent hardware device, (such as, a general-purpose processor, a DSP, a CPU, a microcontroller, an ASIC, an FPGA, a programmable logic device, a discrete gate or transistor logic component, a discrete hardware component, or any combination thereof). In some implementations, the processor 1240 may be configured to operate a memory array using a memory controller. In some implementations, a memory controller may be integrated into processor 1240. The processor 1240 may be configured to execute computer-readable instructions stored in a memory (such as, the memory 1230) to cause the device 1205 to perform various functions (such as, functions or tasks supporting distance-based COT sharing).

In some implementations, the processor 1240 may be a component of a processing system. A processing system may generally refer to a system or series of machines or components that receives inputs and processes the inputs to produce a set of outputs (which may be passed to other systems or components of, for example, the device 1205, such as a UE 115, a base station 105, an access point, a station, or different device). For example, a processing system of the device 1205 may refer to a system including the various other components or subcomponents of the device 1205.

The processing system of the device 1205 may interface with other components of the device 1205, and may process information received from other components (such as inputs or signals), output information to other components, etc. For example, a chip or modem of the device 1205 may include a processing system, a first interface to output information, and a second interface to receive information. In some implementations, the first interface may refer to an interface between the processing system of the chip or modem and a transmitter, such that the device 1205 may transmit information output from the chip or modem. In some implementations, the second interface may refer to an interface between the processing system of the chip or modem and a receiver, such that the device 1205 may receive information or signal inputs, and the information may be passed to the processing system. A person having ordinary skill in the art will readily recognize that the first interface also may receive information or signal inputs, and the second interface also may transmit information.

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some implementations, the code 1235 may not be directly executable by the processor 1240 but may cause a computer (such as, when compiled and executed) to perform functions described herein.

Figure 13:
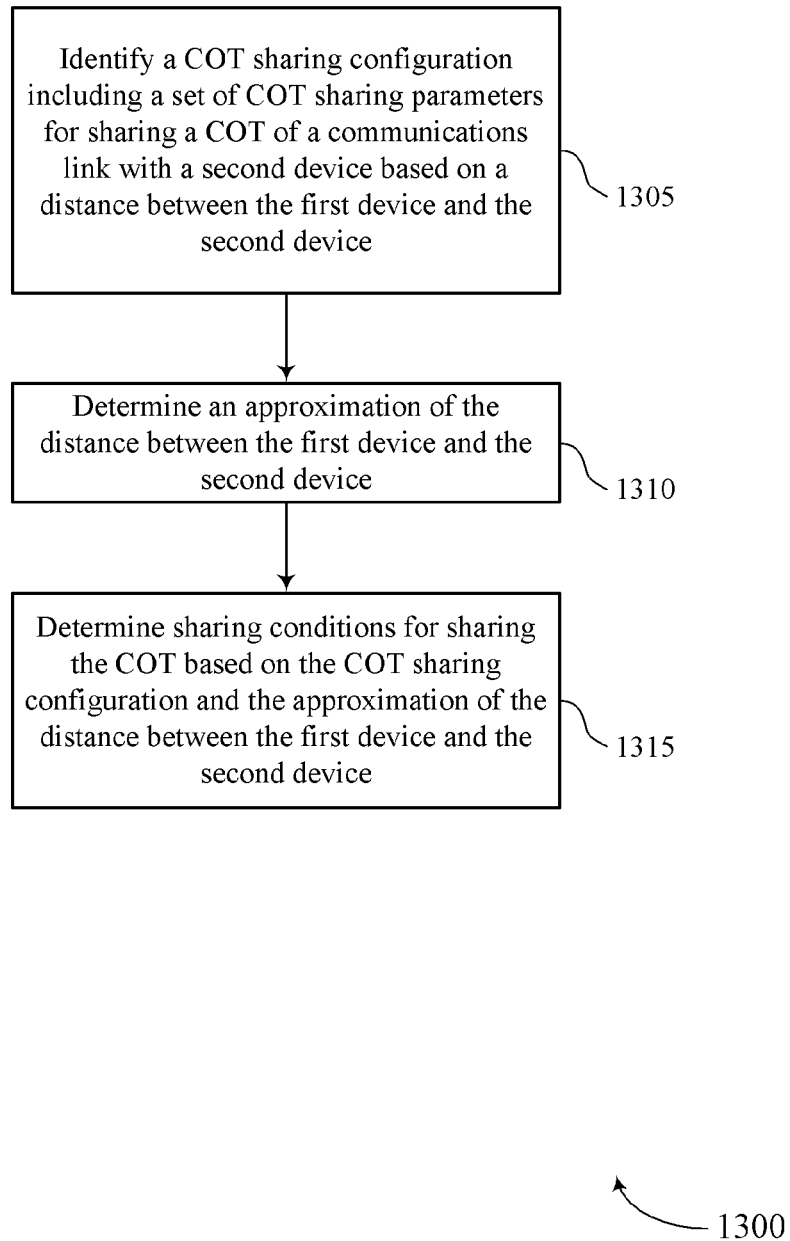
FIGS. 13 through 20 show flowcharts of example methods that support distance-based COT sharing.

FIG. 13 shows a flowchart illustrating an example method 1300 that supports distance-based COT sharing. The operations of method 1300 may be implemented by a UE 115 or its components as described herein. For example, the operations of method 1300 may be performed by a communications manager as described with reference to FIGS. 5-8. In some examples, a UE may execute a set of instructions to control the functional elements of the UE to perform the functions described below. Additionally, or alternatively, a UE may perform aspects of the functions described below using special-purpose hardware.

At 1305, the UE may identify a COT sharing configuration including a set of COT sharing parameters for sharing a COT of a communications link with a second device based on a distance between the first device and the second device. The operations of 1305 may be performed according to the methods described herein. In some examples, aspects of the operations of 1305 may be performed by a COT sharing identifier as described with reference to FIGS. 5-8.

At 1310, the UE may determine an approximation of the distance between the first device and the second device. The operations of 1310 may be performed according to the methods described herein. In some examples, aspects of the operations of 1310 may be performed by a distance approximation component as described with reference to FIGS. 5-8.

At 1315, the UE may determine sharing conditions for sharing the COT based on the COT sharing configuration and the approximation of the distance between the first device and the second device. The operations of 1315 may be performed according to the methods described herein. In some examples, aspects of the operations of 1315 may be performed by a sharing conditions component as described with reference to FIGS. 5-8.

Figure 14:
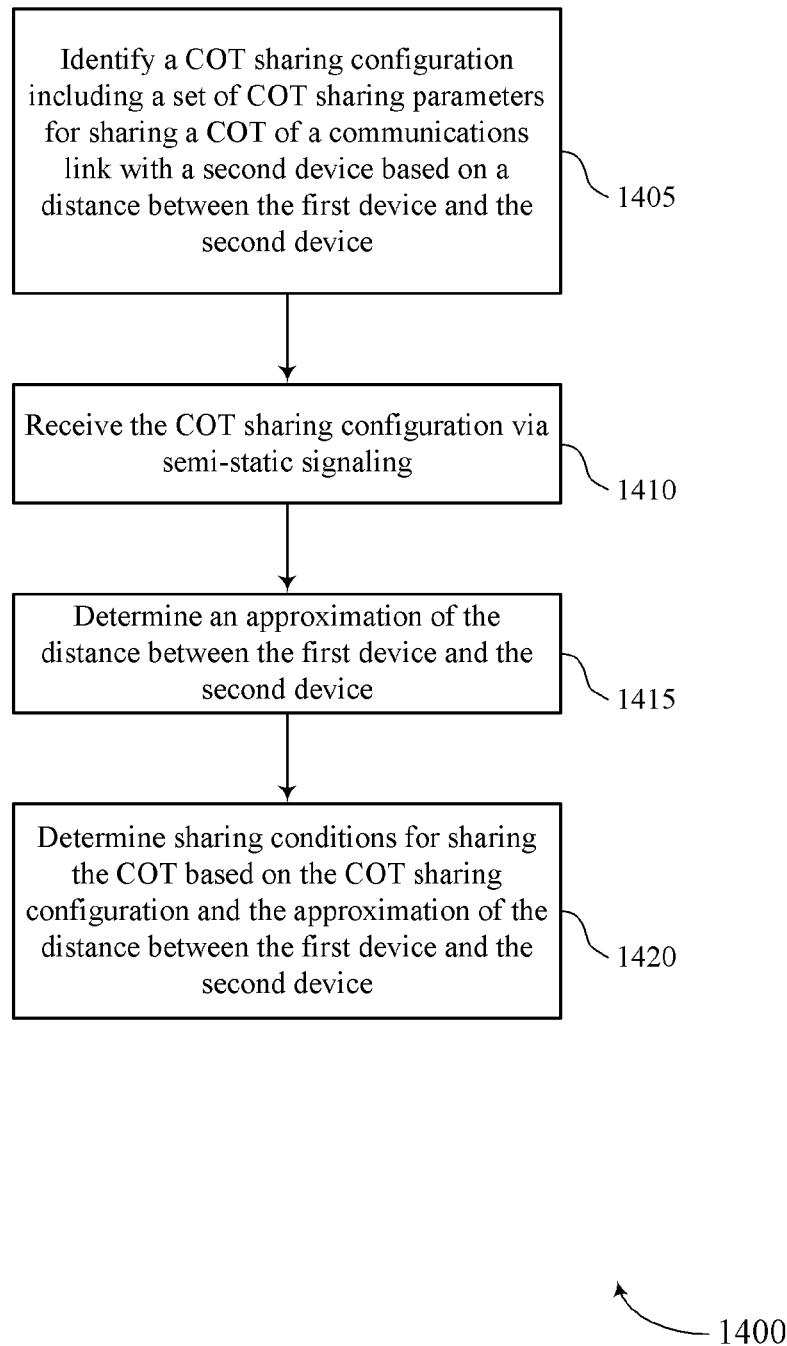

FIG. 14 shows a flowchart illustrating an example method 1400 that supports distance-based COT sharing. The operations of method 1400 may be implemented by a UE 115 or its components as described herein. For example, the operations of method 1400 may be performed by a communications manager as described with reference to FIGS. 5-8. In some examples, a UE may execute a set of instructions to control the functional elements of the UE to perform the functions described below. Additionally, or alternatively, a UE may perform aspects of the functions described below using special-purpose hardware.

At 1405, the UE may identify a COT sharing configuration including a set of COT sharing parameters for sharing a COT of a communications link with a second device based on a distance between the first device and the second device. The operations of 1405 may be performed according to the methods described herein. In some examples, aspects of the operations of 1405 may be performed by a COT sharing identifier as described with reference to FIGS. 5-8.

At 1410, the UE may receive the COT sharing configuration via semi-static signaling. The operations of 1410 may be performed according to the methods described herein. In some examples, aspects of the operations of 1410 may be performed by a COT sharing configuration receiver as described with reference to FIGS. 5-8.

At 1415, the UE may determine an approximation of the distance between the first device and the second device. The operations of 1415 may be performed according to the methods described herein. In some examples, aspects of the operations of 1415 may be performed by a distance approximation component as described with reference to FIGS. 5-8.

At 1420, the UE may determine sharing conditions for sharing the COT based on the COT sharing configuration and the approximation of the distance between the first device and the second device. The operations of 1420 may be performed according to the methods described herein. In some examples, aspects of the operations of 1420 may be performed by a sharing conditions component as described with reference to FIGS. 5-8.

Figure 15:
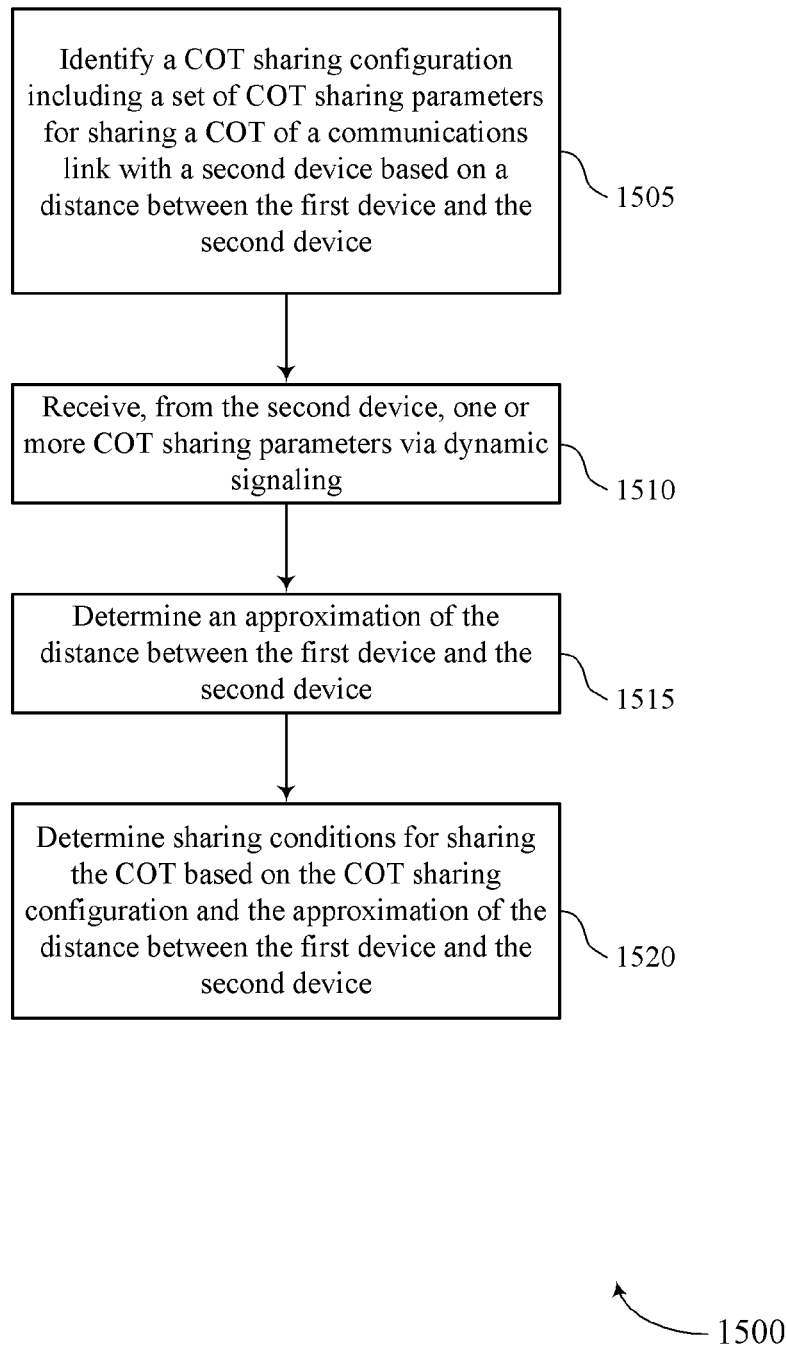

FIG. 15 shows a flowchart illustrating an example method 1500 that supports distance-based COT sharing. The operations of method 1500 may be implemented by a UE 115 or its components as described herein. For example, the operations of method 1500 may be performed by a communications manager as described with reference to FIGS. 5-8. In some examples, a UE may execute a set of instructions to control the functional elements of the UE to perform the functions described below. Additionally, or alternatively, a UE may perform aspects of the functions described below using special-purpose hardware.

At 1505, the UE may identify a COT sharing configuration including a set of COT sharing parameters for sharing a COT of a communications link with a second device based on a distance between the first device and the second device. The operations of 1505 may be performed according to the methods described herein. In some examples, aspects of the operations of 1505 may be performed by a COT sharing identifier as described with reference to FIGS. 5-8.

At 1510, the UE may receive, from the second device, one or more COT sharing parameters via dynamic signaling. The operations of 1510 may be performed according to the methods described herein. In some examples, aspects of the operations of 1510 may be performed by a COT sharing configuration receiver as described with reference to FIGS. 5-8.

At 1515, the UE may determine an approximation of the distance between the first device and the second device. The operations of 1515 may be performed according to the methods described herein. In some examples, aspects of the operations of 1515 may be performed by a distance approximation component as described with reference to FIGS. 5-8.

At 1520, the UE may determine sharing conditions for sharing the COT based on the COT sharing configuration and the approximation of the distance between the first device and the second device. The operations of 1520 may be performed according to the methods described herein. In some examples, aspects of the operations of 1520 may be performed by a sharing conditions component as described with reference to FIGS. 5-8.

Figure 16:
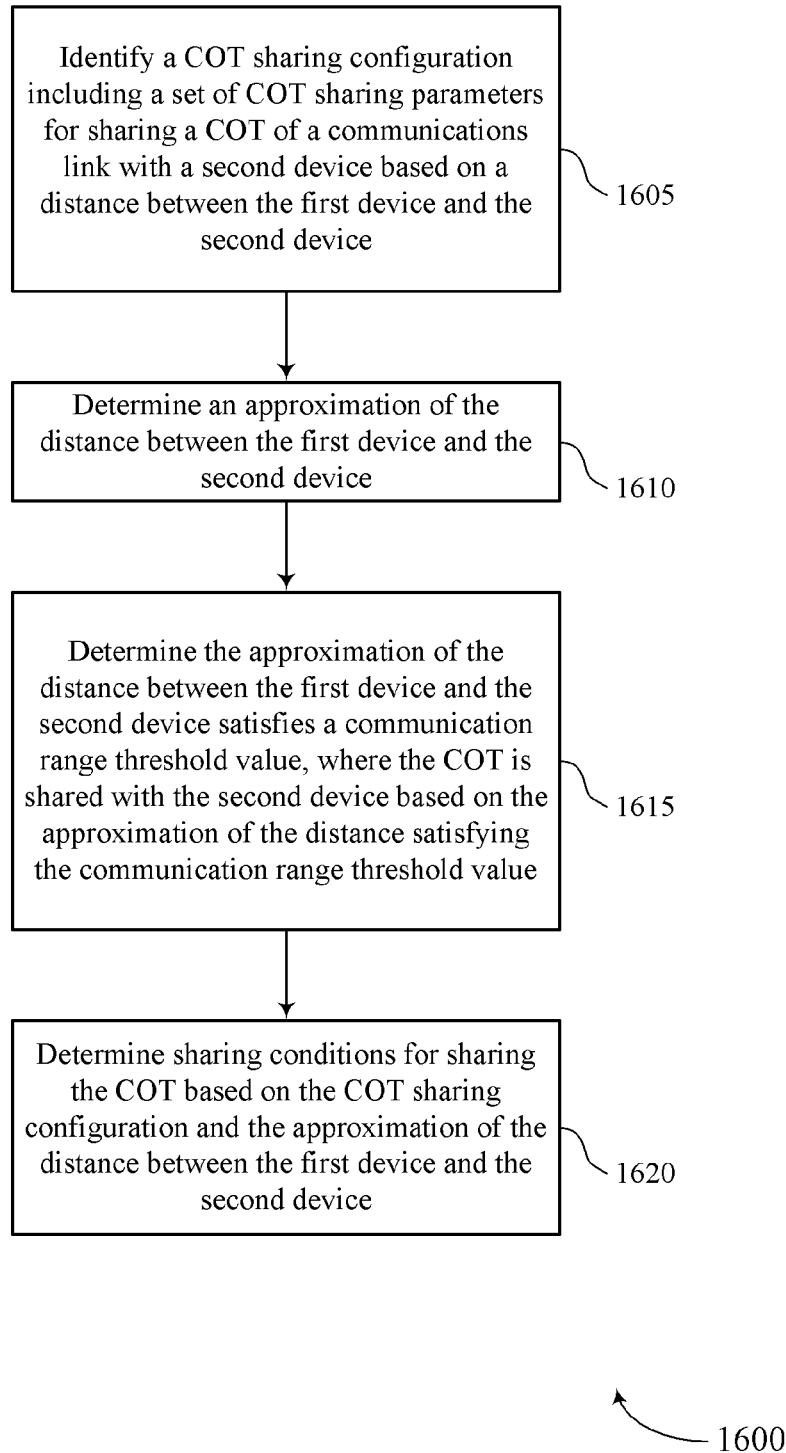

FIG. 16 shows a flowchart illustrating an example method 1600 that supports distance-based COT sharing. The operations of method 1600 may be implemented by a UE 115 or its components as described herein. For example, the operations of method 1600 may be performed by a communications manager as described with reference to FIGS. 5-8. In some examples, a UE may execute a set of instructions to control the functional elements of the UE to perform the functions described below. Additionally, or alternatively, a UE may perform aspects of the functions described below using special-purpose hardware.

At 1605, the UE may identify a COT sharing configuration including a set of COT sharing parameters for sharing a COT of a communications link with a second device based on a distance between the first device and the second device. The operations of 1605 may be performed according to the methods described herein. In some examples, aspects of the operations of 1605 may be performed by a COT sharing identifier as described with reference to FIGS. 5-8.

At 1610, the UE may determine an approximation of the distance between the first device and the second device. The operations of 1610 may be performed according to the methods described herein. In some examples, aspects of the operations of 1610 may be performed by a distance approximation component as described with reference to FIGS. 5-8.

At 1615, the UE may determine the approximation of the distance between the first device and the second device satisfies a communication range threshold value, where the COT is shared with the second device based on the approximation of the distance satisfying the communication range threshold value. The operations of 1615 may be performed according to the methods described herein. In some examples, aspects of the operations of 1615 may be performed by a distance approximation component as described with reference to FIGS. 5-8.

At 1620, the UE may determine sharing conditions for sharing the COT based on the COT sharing configuration and the approximation of the distance between the first device and the second device. The operations of 1620 may be performed according to the methods described herein. In some examples, aspects of the operations of 1620 may be performed by a sharing conditions component as described with reference to FIGS. 5-8.

Figure 17:
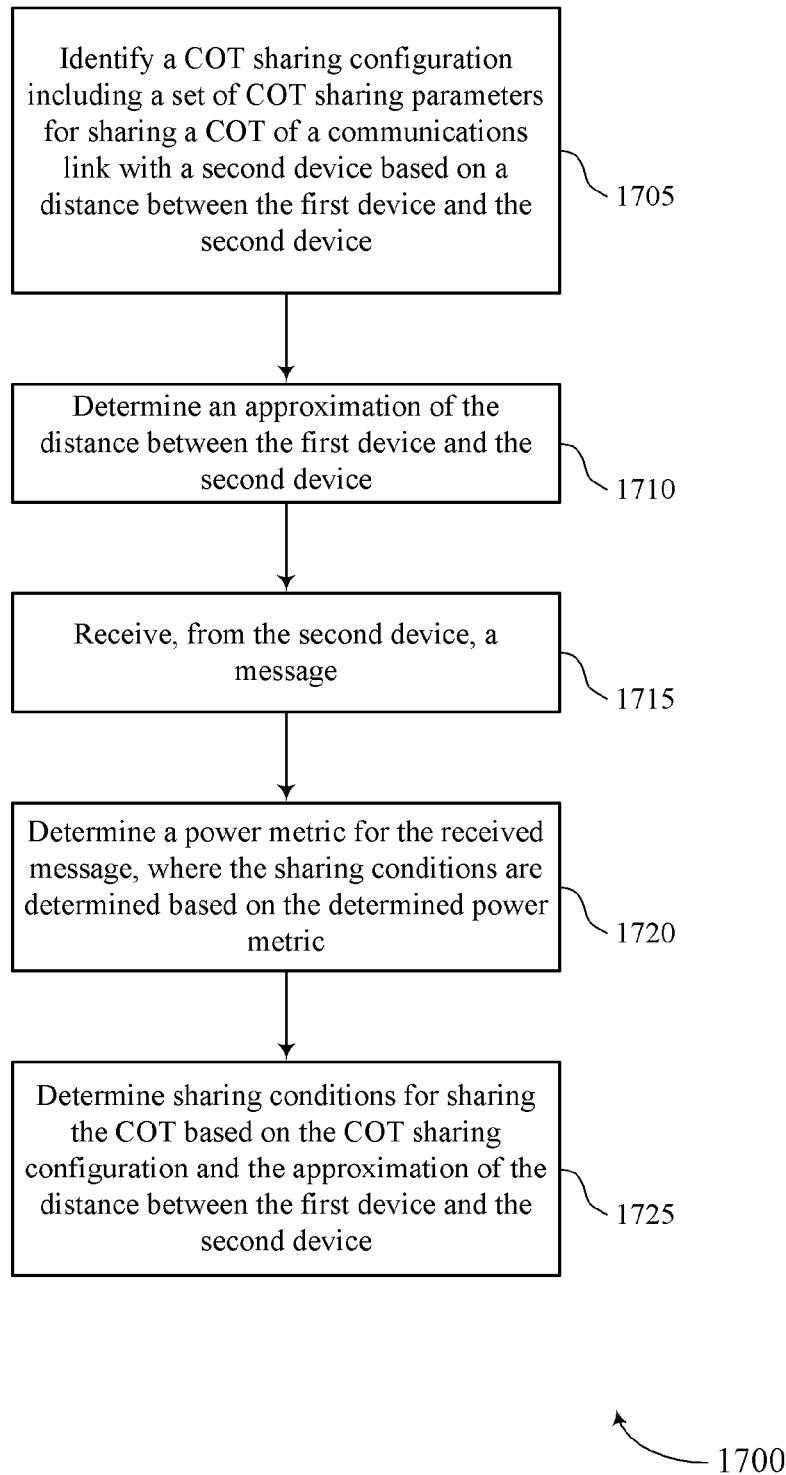

FIG. 17 shows a flowchart illustrating an example method 1700 that supports distance-based COT sharing. The operations of method 1700 may be implemented by a UE 115 or its components as described herein. For example, the operations of method 1700 may be performed by a communications manager as described with reference to FIGS. 5-8. In some examples, a UE may execute a set of instructions to control the functional elements of the UE to perform the functions described below. Additionally, or alternatively, a UE may perform aspects of the functions described below using special-purpose hardware.

At 1705, the UE may identify a COT sharing configuration including a set of COT sharing parameters for sharing a COT of a communications link with a second device based on a distance between the first device and the second device. The operations of 1705 may be performed according to the methods described herein. In some examples, aspects of the operations of 1705 may be performed by a COT sharing identifier as described with reference to FIGS. 5-8.

At 1710, the UE may determine an approximation of the distance between the first device and the second device. The operations of 1710 may be performed according to the methods described herein. In some examples, aspects of the operations of 1710 may be performed by a distance approximation component as described with reference to FIGS. 5-8.

At 1715, the UE may receive, from the second device, a message. The operations of 1715 may be performed according to the methods described herein. In some examples, aspects of the operations of 1715 may be performed by a power metric based sharing component as described with reference to FIGS. 5-8.

At 1720, the UE may determine a power metric for the received message, where the sharing conditions are determined based on the determined power metric. The operations of 1720 may be performed according to the methods described herein. In some examples, aspects of the operations of 1720 may be performed by a power metric based sharing component as described with reference to FIGS. 5-8.

At 1725, the UE may determine sharing conditions for sharing the COT based on the COT sharing configuration and the approximation of the distance between the first device and the second device. The operations of 1725 may be performed according to the methods described herein. In some examples, aspects of the operations of 1725 may be performed by a sharing conditions component as described with reference to FIGS. 5-8.

Figure 18:
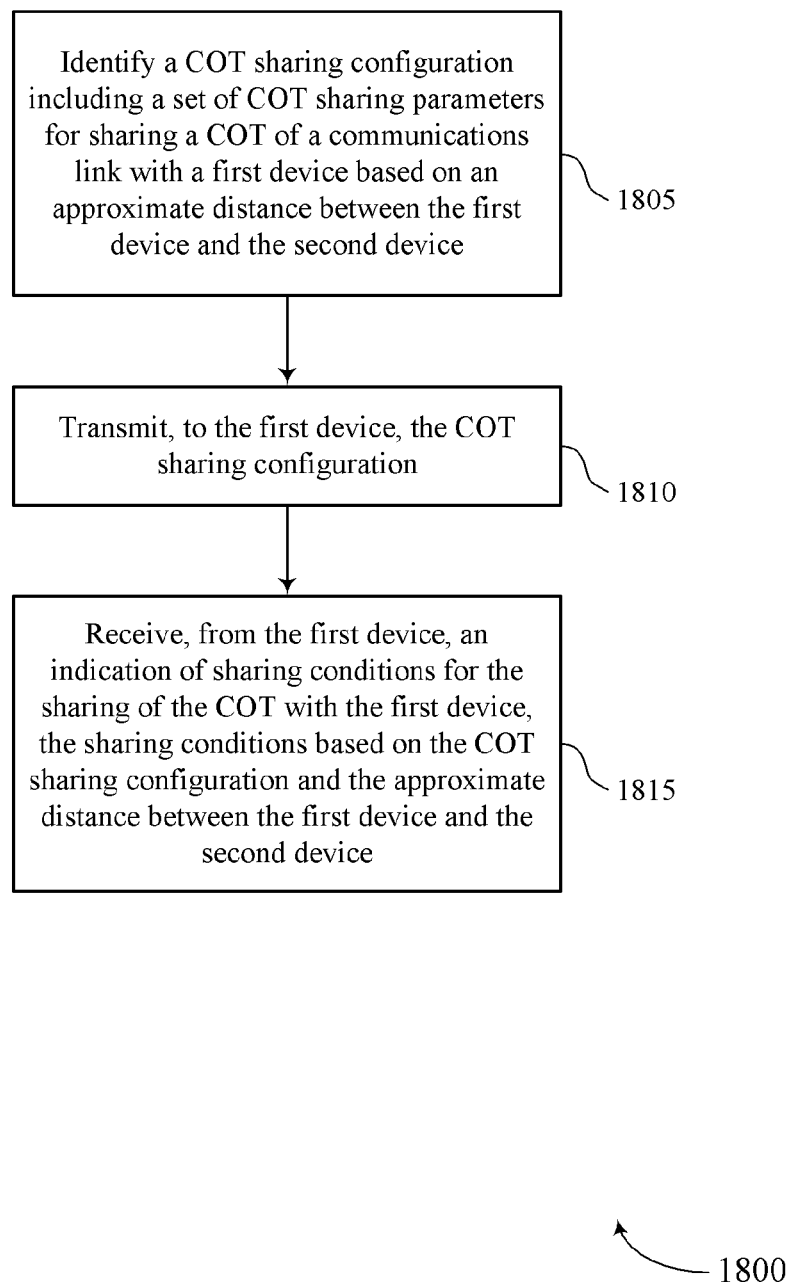

FIG. 18 shows a flowchart illustrating an example method 1800 that supports distance-based COT sharing. The operations of method 1800 may be implemented by a UE 115 or its components as described herein. For example, the operations of method 1800 may be performed by a communications manager as described with reference to FIGS. 5-8. In some examples, a UE may execute a set of instructions to control the functional elements of the UE to perform the functions described below. Additionally, or alternatively, a UE may perform aspects of the functions described below using special-purpose hardware.

At 1805, the UE may identify a COT sharing configuration including a set of COT sharing parameters for sharing a COT of a communications link with a first device based on an approximate distance between the first device and the second device. The operations of 1805 may be performed according to the methods described herein. In some examples, aspects of the operations of 1805 may be performed by a COT sharing identifier as described with reference to FIGS. 5-8.

At 1810, the UE may transmit, to the first device, the COT sharing configuration. The operations of 1810 may be performed according to the methods described herein. In some examples, aspects of the operations of 1810 may be performed by a COT sharing configuration transmitter as described with reference to FIGS. 5-8.

At 1815, the UE may receive, from the first device, an indication of sharing conditions for the sharing of the COT with the first device, the sharing conditions based on the COT sharing configuration and the approximate distance between the first device and the second device. The operations of 1815 may be performed according to the methods described herein. In some examples, aspects of the operations of 1815 may be performed by a sharing conditions indication receiver as described with reference to FIGS. 5-8.

Figure 19:
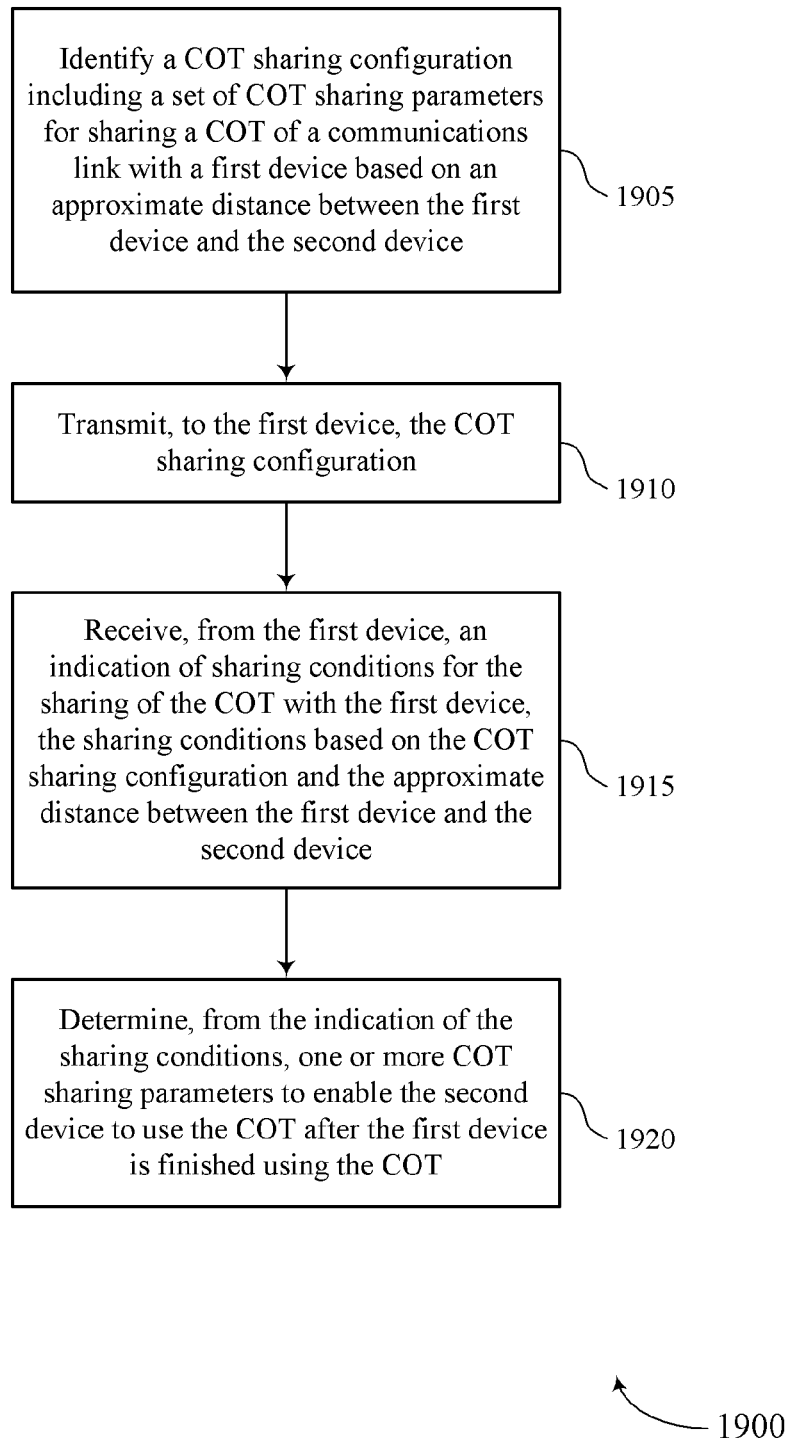

FIG. 19 shows a flowchart illustrating an example method 1900 that supports distance-based COT sharing. The operations of method 1900 may be implemented by a UE 115 or its components as described herein. For example, the operations of method 1900 may be performed by a communications manager as described with reference to FIGS. 5-8. In some examples, a UE may execute a set of instructions to control the functional elements of the UE to perform the functions described below. Additionally, or alternatively, a UE may perform aspects of the functions described below using special-purpose hardware.

At 1905, the UE may identify a COT sharing configuration including a set of COT sharing parameters for sharing a COT of a communications link with a first device based on an approximate distance between the first device and the second device. The operations of 1905 may be performed according to the methods described herein. In some examples, aspects of the operations of 1905 may be performed by a COT sharing identifier as described with reference to FIGS. 5-8.

At 1910, the UE may transmit, to the first device, the COT sharing configuration. The operations of 1910 may be performed according to the methods described herein. In some examples, aspects of the operations of 1910 may be performed by a COT sharing configuration transmitter as described with reference to FIGS. 5-8.

At 1915, the UE may receive, from the first device, an indication of sharing conditions for the sharing of the COT with the first device, the sharing conditions based on the COT sharing configuration and the approximate distance between the first device and the second device. The operations of 1915 may be performed according to the methods described herein. In some examples, aspects of the operations of 1915 may be performed by a sharing conditions indication receiver as described with reference to FIGS. 5-8.

At 1920, the UE may determine, from the indication of the sharing conditions, one or more COT sharing parameters to enable the second device to use the COT after the first device is finished using the COT. The operations of 1920 may be performed according to the methods described herein. In some examples, aspects of the operations of 1920 may be performed by a sharing conditions indication receiver as described with reference to FIGS. 5-8.

Figure 20:
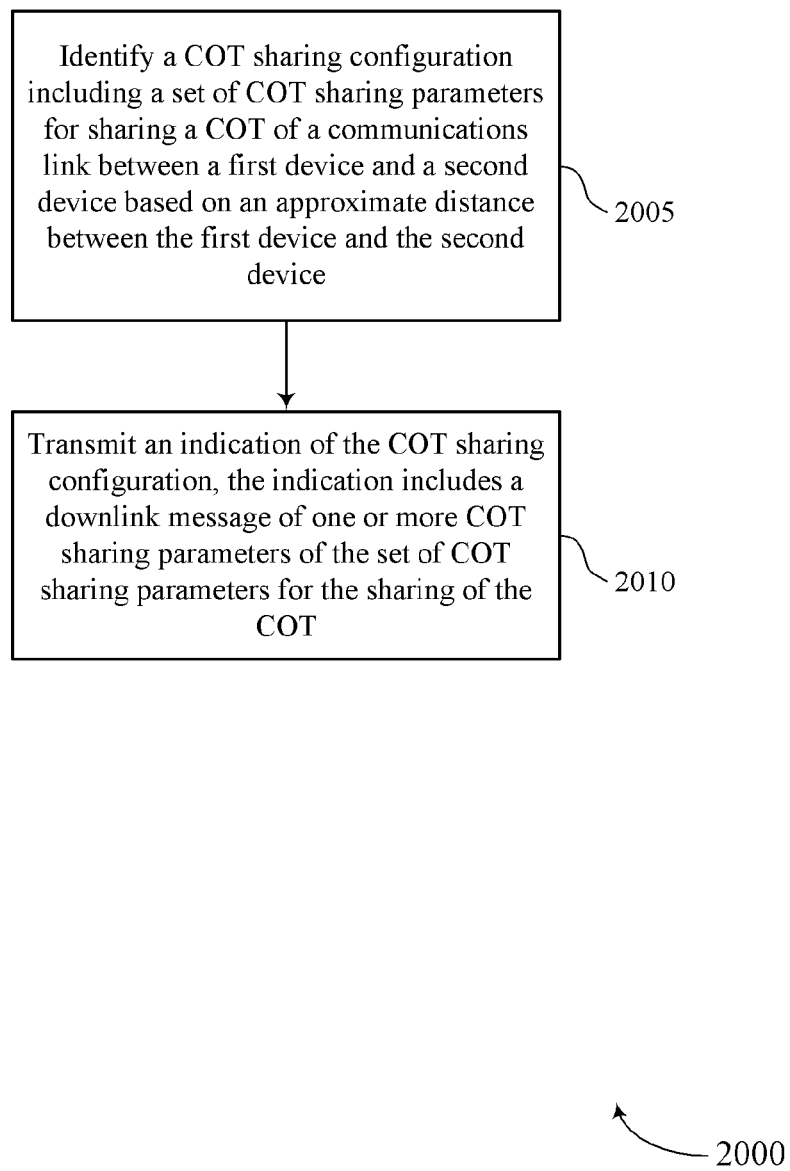

FIG. 20 shows a flowchart illustrating an example method 2000 that supports distance-based COT sharing. The operations of method 2000 may be implemented by a base station 105 or its components as described herein. For example, the operations of method 2000 may be performed by a communications manager as described with reference to FIGS. 9-12. In some examples, a base station may execute a set of instructions to control the functional elements of the base station to perform the functions described below. Additionally, or alternatively, a base station may perform aspects of the functions described below using special-purpose hardware.

At 2005, the base station may identify a COT sharing configuration including a set of COT sharing parameters for sharing a COT of a communications link between a first device and a second device based on an approximate distance between the first device and the second device. The operations of 2005 may be performed according to the methods described herein. In some examples, aspects of the operations of 2005 may be performed by a COT sharing configuration identifier as described with reference to FIGS. 9-12.

At 2010, the base station may transmit an indication of the COT sharing configuration, the indication includes a downlink message of one or more COT sharing parameters of the set of COT sharing parameters for the sharing of the COT. The operations of 2010 may be performed according to the methods described herein. In some examples, aspects of the operations of 2010 may be performed by a COT sharing indicator as described with reference to FIGS. 9-12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), IEEE 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification can also be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some implementations be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. A first device for wireless communications, comprising:
   a first interface configured to:
     obtain a channel occupancy time (COT) sharing configuration via control signaling, the COT sharing configuration including a plurality of COT sharing parameters for sharing a COT of a communication link with a second device based at least in part on a distance between the first device and the second device; and
     obtain an indication associated with an approximation of the distance between the first device and the second device; and
   a processing system configured to:
     and
     share the COT based at least in part on the COT sharing configuration and the approximation of the distance between the first device and the second device.

2. The first device of claim 1,
   wherein the first interface is further configured to obtain the COT sharing configuration via semi-static signaling.

3. The first device of claim 1,
   wherein the first interface is further configured to:
     obtain one or more COT sharing parameters via dynamic signaling.

4. The first device of claim 1, wherein the approximation of the distance between the first device and the second device satisfies a communication range threshold value.

5. The first device of claim 4,
   wherein the first interface is further configured to:
     obtain a control information message, wherein the processing system is further configured to:
     decode the control information message, wherein the communication range threshold value is based at least in part on the decoded control information message.

6. The first device of claim 4, wherein:
   the COT is shared with the second device based at least in part on the approximation of the distance satisfying the communication range threshold value.

7. The first device of claim 1, wherein the first interface is further configured to
   obtain a control information message comprising the indication associated with the approximation of the distance between the first device and the second device, the indication comprising a zone identifier associated with the second device,
   wherein the processing system is further configured to estimate the distance between the first device and the second device based at least in part on the zone identifier associated with the second device in the control information message and a location of the first device.

8. The first device of claim 1, wherein sharing the COT is based at least in part on a transmission type that can be shared within the COT, a duration for the sharing of the COT, or both corresponding to the approximation of the distance and an energy detection threshold used by the second device.

9. The first device of claim 8,
   wherein the first interface is further configured to:
     obtain an indication of the energy detection threshold used by the second device.

10. The first device of claim 1,
    wherein the first interface is further configured to:
    obtain a message, wherein sharing the COT is based at least in part on
    a power metric for the obtained message.

11. The first device of claim 10, wherein:
    the power metric comprises a pathloss measurement, a reference signal received power measurement, a reference signal power for the message, or a combination thereof.

12. The first device of claim 1, further comprising:
    a second interface configured to:
    output an indication of sharing conditions, wherein the indication of sharing conditions comprises a message of one or more COT sharing parameters of the plurality of COT sharing parameters for the sharing of the COT.

13. The first device of claim 1, wherein:
the COT sharing configuration is designed for a relay operation.

14. The first device of claim 1, wherein:
the plurality of COT sharing parameters comprises a sharing duration, one or more distance thresholds, an energy detection threshold, a type of transmission for the first device to use during the COT, a reference signal received power threshold value, or a combination thereof.

15. A second device for wireless communications, comprising:
a first interface configured to obtain a channel occupancy time (COT) sharing configuration via control signaling, the COT sharing configuration including a plurality of COT sharing parameters for sharing a COT of a communications link with a first device based at least in part on an approximate distance between the first device and the second device; and
obtain an indication of sharing conditions for the sharing of the COT with the first device, the sharing conditions based at least in part on the COT sharing configuration and the approximate distance between the first device and the second device.

16. The second device of claim 15, wherein
the indication of the sharing conditions comprises one or more COT sharing parameters to enable the first device to use the COT after the second device is finished using the COT.

17. The second device of claim 16, wherein:
the one or more COT sharing parameters comprise a starting time for the first device to begin using the COT, a type of transmission the first device is permitted to transmit in the COT, or a combination thereof.

18. The second device of claim 15, further comprising:
a second interface configured to:
output one or more COT sharing parameters via dynamic signaling.

19. The second device of claim 15, further comprising:
a second interface configured to:
output a control information message, wherein the control information message comprises a zone identifier associated with the second device.

20. A base station for wireless communications, comprising:
a first interface configured to:
output, via control signaling, an indication of a COT sharing configuration including a plurality of COT sharing parameters for sharing a COT of a communications link between a first device and a second device based at least in part on an approximate distance between the first device and the second device, wherein the indication comprises a downlink message of one or more COT sharing parameters of the plurality of COT sharing parameters for the sharing of the COT.

21. The base station of claim 20, further comprising:
a second interface configured to:
obtain an indication of sharing conditions for the sharing of the COT between the first device and the second device, wherein the sharing conditions are based at least in part on the approximate distance between the first device and the second device.

22. The apparatus base station of claim 20, wherein the first interface is further configured to:
output the COT sharing configuration via semi-static signaling.

23. The base station of claim 20, wherein:
the COT sharing configuration is designed for a relay operation.

24. A method for wireless communications at a first device, comprising:
receiving control signaling comprising a channel occupancy time (COT) sharing configuration including a plurality of COT sharing parameters for sharing a COT of a communications link with a second device based at least in part on a distance between the first device and the second device;
receiving an indication associated with an approximation of the distance between the first device and the second device; and
sharing the COT based at least in part on the COT sharing configuration and the approximation of the distance between the first device and the second device.

25. The method of claim 24,
wherein the distance between the first device and the second device satisfies a communication range threshold value.

26. The method of claim 24, wherein further comprising:
receiving, from the second device, a control information message comprising the indication associated with the approximation of the distance between the first device and the second device, the indication comprising a zone identifier associated with the second device; and
estimating the distance between the first device and the second device based at least in part on the zone identifier associated with the second device in the control information message and a location of the first device.

27. The method of claim 24, wherein sharing the COT:
is based at least in part on a transmission type that can be shared within the COT, a duration for the sharing of the COT, or both corresponding to the approximation of the distance and an energy detection threshold used by the second device.

28. The method of claim 24, further comprising:
receiving, from the second device, a message, wherein sharing the COT is based at least in part on
a power metric for the received message.

29. The method of claim 24, further comprising:
transmitting an indication of sharing conditions, wherein the indication of sharing conditions comprises a message of one or more COT sharing parameters of the plurality of COT sharing parameters for the sharing of the COT.

30. The method of claim 24, wherein:
the plurality of COT sharing parameters comprises a sharing duration, one or more distance thresholds, an energy detection threshold, a type of transmission for the first device to use during the COT, a reference signal received power threshold value, or a combination thereof.

* * * * *